(12) United States Patent
Horimoto

(10) Patent No.: US 6,382,680 B1
(45) Date of Patent: May 7, 2002

(54) COUPLER APPARATUS AND METHOD OF MANUFACTURING THE SAME

(75) Inventor: Akira Horimoto, Tochigi-ken (JP)

(73) Assignee: Sakura Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/548,454

(22) Filed: Apr. 13, 2000

Related U.S. Application Data

(63) Continuation of application No. PCT/JP97/03733, filed on Oct. 16, 1997.

(51) Int. Cl.⁷ ............................................. F16L 35/00
(52) U.S. Cl. ........................... 285/81; 285/84; 285/87; 285/91; 285/114; 285/119; 285/352; 285/360; 285/906
(58) Field of Search ............................ 285/81, 82, 84, 285/85, 86, 91, 87, 114, 360, 361, 119, 376, 396, 401, 402, 68, 72, 73, 76–79, 352, 906

(56) References Cited

U.S. PATENT DOCUMENTS

| 185,494 | A | * | 12/1876 | Chase | 285/352 |
| 1,300,414 | A | * | 4/1919 | Klell | 285/73 |
| 1,611,286 | A | * | 12/1926 | Shaff | 285/70 |
| 1,914,368 | A | * | 6/1933 | Godall | 285/73 |
| 3,201,151 | A | * | 8/1965 | Westveer | 285/73 |
| 3,422,390 | A | * | 1/1969 | Tucker | 285/85 |
| 4,523,778 | A | * | 6/1985 | Ebert | 285/73 |
| 4,643,459 | A | * | 2/1987 | Carson | 285/84 |
| 4,960,153 | A | * | 10/1990 | Bergsma | 285/361 |
| 5,184,851 | A | * | 2/1993 | Sparling et al. | 285/79 |
| 5,397,196 | A | * | 3/1995 | Boiret et al. | 285/376 |
| 5,727,739 | A | * | 3/1998 | Hamilton | 285/361 |

FOREIGN PATENT DOCUMENTS

| JP | 6336592 | 3/1988 | ............. E21D/9/06 |
| JP | 9119577 | 5/1997 | ............ F16L/37/24 |

* cited by examiner

*Primary Examiner*—Teri Pham Luu
(74) *Attorney, Agent, or Firm*—Volpe and Koenig, P.C.

(57) ABSTRACT

A coupler apparatus for hoses, etc. comprises a pair of coupler bodies 1*a*, 1*b* having no distinction between male and female and having the same structure. Front end faces of the coupler bodies are provided with seal faces 5. In addition, the front end faces of the coupler bodies are provided with a plurality of engaging projections 8 and engaging recesses 7 formed among the engaging projections. The engaging projections 8 and engaging recesses 7 are axially engaged with the engaging projections 8 and engaging recesses 7 of the mating coupler body in a complementary manner. One side face 8*a* of each engaging projection 8 is provided with an engaging hook portion 9, and the engaging hook portions 9 are circumferentially engaged to couple the pair of the coupler bodies 1*a*, 1*b*. At least both side faces 8*a*, 8*b* of the engaging projection 8 are defined by radially extending planes passing through a central axis of the coupler body.

8 Claims, 17 Drawing Sheets

COUPLER APPARATUS AND METHOD OF MANUFACTURING THE SAME

CROSS REFERENCE TO RELATED APPLICATIONS

This is a continuation of application Ser. No. PCT/JP97/03733, filed Oct. 16, 1997.

BACKGROUND OF THE INVENTION

The present invention relates to a coupler apparatus, for example, a coupler apparatus for coupling hoses such as fire hoses or coupling a hose and a device such as a pump, or a coupler apparatus for coupling other members, and a method of manufacturing such coupler apparatus. More particularly, this invention relates to a coupler apparatus comprising a pair of main bodies having identical structures without distinction between male and female structures, and a method of manufacturing the same.

In a conventional coupler apparatus, for example, a conventional insertion-type coupler apparatus for fire hoses, a pair of coupler bodies to be coupled comprise distinctive male and female bodies. One of the coupler bodies is constructed as a male metal fitting member, and the other as a female metal fitting member. Male metal fitting members cannot be coupled to each other, nor can female metal fitting members be coupled to each other. For example, in case of fire fighting, where a plurality of fire hoses are extended and coupled, the fire hoses may be misarranged such that the male fitting members or female fitting members are opposed to each other. Such misarrangement should preferably be prevented in view of facility and exactness in fire fighting. In addition, in the case of the conventional coupler apparatus, two types of metal fitting members with different structures, i.e. a male metal fitting member and a female metal fitting member, have to be manufactured, and this increases the manufacturing cost.

In order to overcome such drawbacks, there is a demand for an insertion-type coupler apparatus which comprises a pair of complementary coupler bodies with no distinction between male and female and with identical structures, wherein the coupler bodies can be freely coupled with no distinction between male and female, can be easily coupled/decoupled, have simple structures and high reliability, and can be manufactured at low cost.

Such a coupler apparatus, an apparatus can be thought of, wherein engaging projections and engaging recesses are mutually engaged in the axial direction and engaging hook portions provided on side faces of the engaging projections and engaging recesses are engaged in the circumferential direction, whereby a pair of coupler bodies are coupled. Various kinds of geometrical shapes can be considered as shapes of engaging portions of the coupler apparatus with such structure. In an actual coupler apparatus, however, smoothness of coupling, reliability, etc. need to be taken into account, and the following problems, for example, need to be considered.

A first problem is tightness in contact between, and machining of, the aforementioned complementary engaging projections and recesses.

In this type of coupler apparatus, the engaging projection and engaging recess are engaged. Thus, the smoothness in coupling/decoupling, and reliability, strength, etc. in coupling are greatly affected by the precision of the engaging projection, engaging recess and engaging portion. These elements are precisely machined by cutting. Specifically, cylindrical works for forming the coupling bodies are first manufactured, and then end portions thereof are milled. Thus, the engaging projection and engaging recess are formed.

Since these engaging projections and engaging recess have complementary shapes, the engaging recesses are cut at predetermined intervals and thus those portions intervening among the engaging recesses are formed as engaging projections. Where the engaging projections and engaging recesses are milled, one engaging recess is cut in the work, the work is then rotated by a predetermined angle, and a next engaging recess is cut. In this way, all engaging projections and engaging recesses are formed.

For example, where the number of engaging projections and the number of engaging recesses are six, respectively, these engaging recesses are formed at intervals of 60°. In addition, since these engaging projections and engaging recesses are substantially complementary, as mentioned above, the engaging projection and engaging recess are formed over about 30°.

In a general milling machine, a work is fixed and a milling tool is moved in one or two axes along a predetermined locus. The work is thus cut into a predetermined shape. In the case of the cutting by the milling machine, the cut faces of the respective parts are normally parallel to one another. Accordingly, for example, both inner faces of one engaging recess are parallel to each other, and also both side faces of an engaging projection formed between the engaging recesses are parallel to each other. Consequently, for example, if one inner side face or side face formed on the aforementioned engaging hook portion is a radial face passing through a central axis of the cylindrical coupler body, the other inner side face or side face is inclined at about 30° to the radial direction.

As a result, where the coupler bodies are to be abutted on and engaged with each other, the other side face of the engaging projection of one of the coupler bodies and the other inner side face of the engaging recess of the other coupler body are displaced by 30° from each other in opposite directions in respect of the radial face extending through the central axis. Consequently, a large gap is created between these side face and inner side face.

If such a gap is created, sand or pebbles enter the gap and cause malfunction of the coupler. Moreover, if the side face and the inner side face are engaged with an angle in the radial direction, a radial component force will occur in a reaction force acting therebetween. Besides, where the other side face or inner side face, for example, is provided with an urging mechanism, etc. for urging and engaging the aforementioned engaging hook portions in the circumferential direction, circumferential and radial component force will occur in the urging force of the urging mechanism.

According to various test results, it has turned out that drawbacks, such as loss of smoothness of coupling/decoupling of the coupler apparatus, occur due to the component force. Specifically, where the coupler bodies are to be coupled, the engaging projections and engaging recesses of the paired coupler bodies are axially engaged against the urging force of the urging mechanism until the engaging hook portions are completely engaged. In this case, if the radial component force is non-uniform among the engaging projections or engaging recesses, an undesirable radial repulsive force will occur in these coupler bodies. Consequently, the center axes of the paired coupler bodies are misaligned or inclined. Such drawbacks will deteriorate smoothness of coupling/decoupling.

In order to overcome the drawbacks, it is thought to incline said one side face or inner side face and the other side face or inner side face by equal angles in respect of the radial direction, e.g. 15°. However, where the internal pressure of the hoses is acting, a great axial load will act on said one side face or inner side face on which the engaging hook portion is provided. It is thus undesirable to inline the side face or inner side face in respect of the radial direction, on which such a load acts and the engaging hook portion is provided.

In order to facilitate mutual engagement of the engaging projection and engaging recess, it is desirable that the engaging projection and engaging recess be tapered such that the width thereof in the circumferential direction decreases toward the distal end or toward the bottom. In this case, however, the side face and inner side face of the engaging projection and engaging recess are also inclined in respect of the axial direction, and the directions of the aforementioned component force become more complex. A predetermined gap is provided for smooth engagement between the engaging projection and engaging recess. This gap may cause the central axes of the paired coupler bodies to be easily displaced or inclined during coupling. Consequently, the smoothness in engagement may be deteriorated due to the aforementioned undesirable component force. In particular, in the case of the coupler apparatus for fire hoses, the smoothness and exactness of coupling is important and the factors of deterioration in smooth coupling need to be eliminated.

A second problem relates to improvement of reliability in engagement of the engaging hook portions of the engaging projections.

In the coupler, jaw portions of the engaging hook portions are engaged and coupled in the circumferential direction. If an external load or shock acts to rotate the coupler bodies, the engagement of the engaging hook portions may undesirably be released. In particular, when no hydraulic pressure acts within the hoses, no axial load acts on the engagement portion between the engaging hook portions and the engagement tends to be undesirably released.

A third problem relates to removal of water from the inside of hoses at the time of storing the hoses, in a case where the coupler apparatus is applied to the coupler for hoses such as fire hoses.

In the prior art, when fire hoses, for example, are wound and stored after use, the coupler apparatuses provided between the fire hoses are decoupled and each fire hose is wound individually. However, where many fire hoses are connected over a long distance, it will require many persons and labor to wind and store each fire hose individually, and this is inefficient.

To overcome this problem, it is thought to automatically wind many fire hoses which are connected and extended over a long distance. For this purpose, a system may be used wherein, for example, a self-advancing vehicle is provided with a large-sized winding reel and the extended fire hoses are automatically wound by the winding reel.

Where this apparatus is used, however, if coupler apparatuses of many connected fire hoses are first separated, it becomes necessary to attach the end portion of each fire hose at the time of winding, and the efficiency of work decreases. To overcome this problem, it is preferable to wind up many connected fire hoses without separating them.

In this case, however, removal of water from the inside of the connected fire hoses is difficult. When fire hoses are wound up, each hose is flattened in cross section. It is thus necessary to exhaust water from the hoses. Where the couplers of the fire hoses are first separated, as mentioned above, water is easily exhausted from ends of fire hoses. However, where may fire hoses in the connected state are to be wound, water remaining in the hoses is not easily removed. Consequently, the speed of winding decreases and the resistance to winding increases. In particular, where fire hoses are extended over an ascending slope, internal water is difficult to exhaust due to water head and the above problems become more conspicuous.

On dredging sites, civil work sites or construction sites, many water-feed hoses are often connected over a long distance for exhausting or supplying water. Such water-feed hoses have large diameters and high rigidity and their cross sections are not easily reduced. In a state in which the hoses are filled with water, the hoses are heavy and are difficult to handle. It is thus necessary to exhaust water from the water-feed hoses before separating couplers of the water-feed hoses and removing and storing the hoses.

However, where water-feed hoses are extended over a long distance on a place with a great difference in level, it may be difficult to completely exhaust water due to an internal negative pressure in the hoses, even if water is to be exhausted from one end of the connected water-feed hoses. In such a case, it is also difficult to separate couplers provided midway along the connected water-feed hoses. As a result, the work for removing and storing the water-feed hoses becomes very difficult.

BRIEF SUMMARY OF THE INVENTION

The present invention has been made in consideration of the above circumstances. The object of the present invention is to provide a coupler apparatus comprising a pair of coupler bodies which have no distinction between male and female and have the same structure, and a method for achieving sure and smooth engagement in this coupler apparatus and manufacturing the coupler apparatus with high efficiency.

In order to achieve the object, a coupler apparatus of this invention comprises coupler bodies and each coupler body has complementary engaging projections and engaging recesses. One side face of each engaging projection has an engaging hook portion, and the engaging hook portions of the engaging projections are engaged with each other.

At least both side faces of the engaging projection or at least both inner side faces of the engaging recess are defined by substantially radially extending planes passing through or near a center axis of the coupler body.

As regards the engaging projections and engaging recesses with such shapes, since their both side faces or both inner side faces are defined by radially extending planes, both side faces or both inner side faces are tightly engaged in the radial direction when the paired coupler bodies are abutted upon and engaged with each other. Accordingly, the gap between the side faces can be reduced to a minimum necessary for engagement/disengagement of the coupler bodies, and entrance of sand, mud, etc. in the gap can be prevented.

Since the side faces are mutually opposed in the radial direction and disposed close to each other or put in tight contact, no component force occurs in an undesired direction at the time of engagement. Thus, the engagement is made smooth, easy and sure.

Preferably, in the coupler apparatus of the present invention, one side face of the engaging projection is provided with an engaging hook portion, and the other side face of the engaging projection is inclined with respect to an axial direction of the coupler body such that the other side face is reduced in width toward a distal end portion thereof. Accordingly, engagement between the engaging projection and engaging recess is made easy and ensured. In this case, too, since the inclined other side face is defined by the radially extending plane passing through the central axis, the other side faces are tightly engaged and the gap therebetween is reduced to a minimum. Moreover, no component force occurs in an undesired direction.

According to a preferred mode of the present invention, there is provided a lock mechanism for preventing undesired disengagement of the engaging hook portion.

The coupler apparatus of the present invention has optimal characteristics as a coupler apparatus for fire hoses, water feed hoses used in construction sites, dredging sites, etc., air hoses, hydraulic hoses, household water supply hoses, other hoses, pipes, etc. Where the coupler apparatus is used as a coupler for such hoses or pipes, abutment-type seal mechanisms are provided on front end faces of the coupler bodies, thereby to ensure sealing between abutment faces of the coupler bodies.

The seal mechanism may have a function of draining an inside fluid when an internal pressure is substantially equal to an external pressure. With this type of seal mechanism, inside water can automatically be drained where a plurality of fire hoses are wound up in the state in which they remain attached to the coupler apparatus. Thus, the winding is facilitated. Even where the coupler apparatus is used for other hoses, removal or shift of the hoses is facilitated.

A manufacturing method of the present invention comprises the steps of: holding a cylindrical work for forming at least part of the coupler body such that the work is rotatable about a central axis thereof; holding a milling tool for cutting an edge portion of the work and forming the engaging recesses and engaging projections such that the milling tool is movable in an axial direction of the work; and cutting the edge portion of the work while the work is being rotated about the central axis thereof and the milling tool is being axially moved, thus forming the engaging recesses and engaging projections.

According to this manufacturing method, all side faces or inner side faces of the engaging projections and engaging recesses are defined by radially extending planes passing through the central axis. According to this manufacturing method, even where the engaging projection or engaging recess has a simple shape such as a rectangular shape in plan, or a trapezoidal shape, a triangular shape or a curved shape in plan, the side faces can be defined by radially extending planes passing through the central axis.

The coupler apparatus of the present invention is applicable not only to the aforementioned hoses, pipes, etc. for fluid passage, but also to members through which no fluid is passed, such as structural members. In this case, as a matter of course, the aforementioned seal mechanism is not needed.

The coupler apparatus of the prevention may be formed of a metallic material, a synthetic resin material, or other freely chosen material. The manufacturing method is not limited to the above-mentioned cutting process, but a molding process, an injection molding process, or other freely chosen processes may be used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
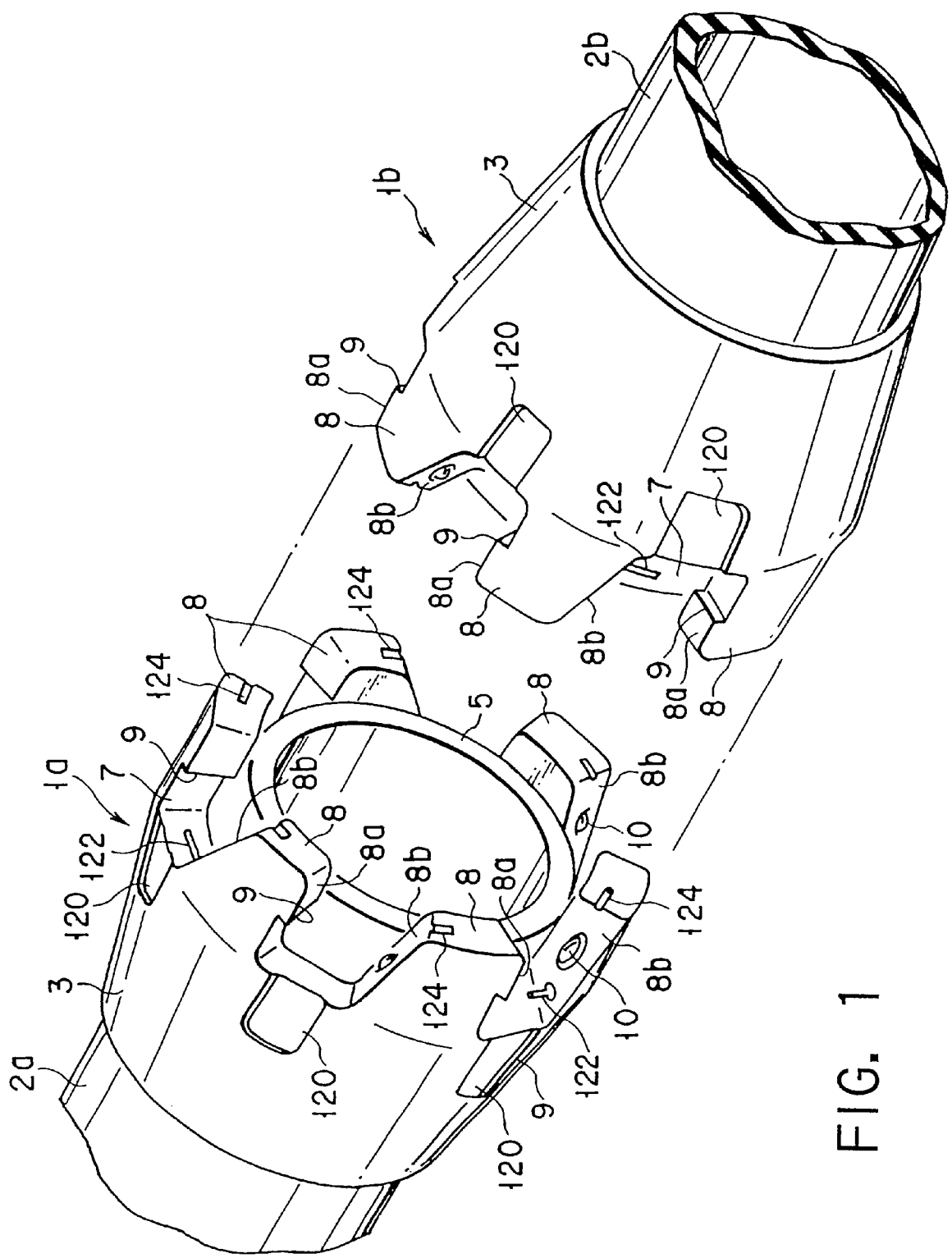
FIG. 1 is a perspective view of a coupler apparatus according to a first embodiment.
Figure 2:
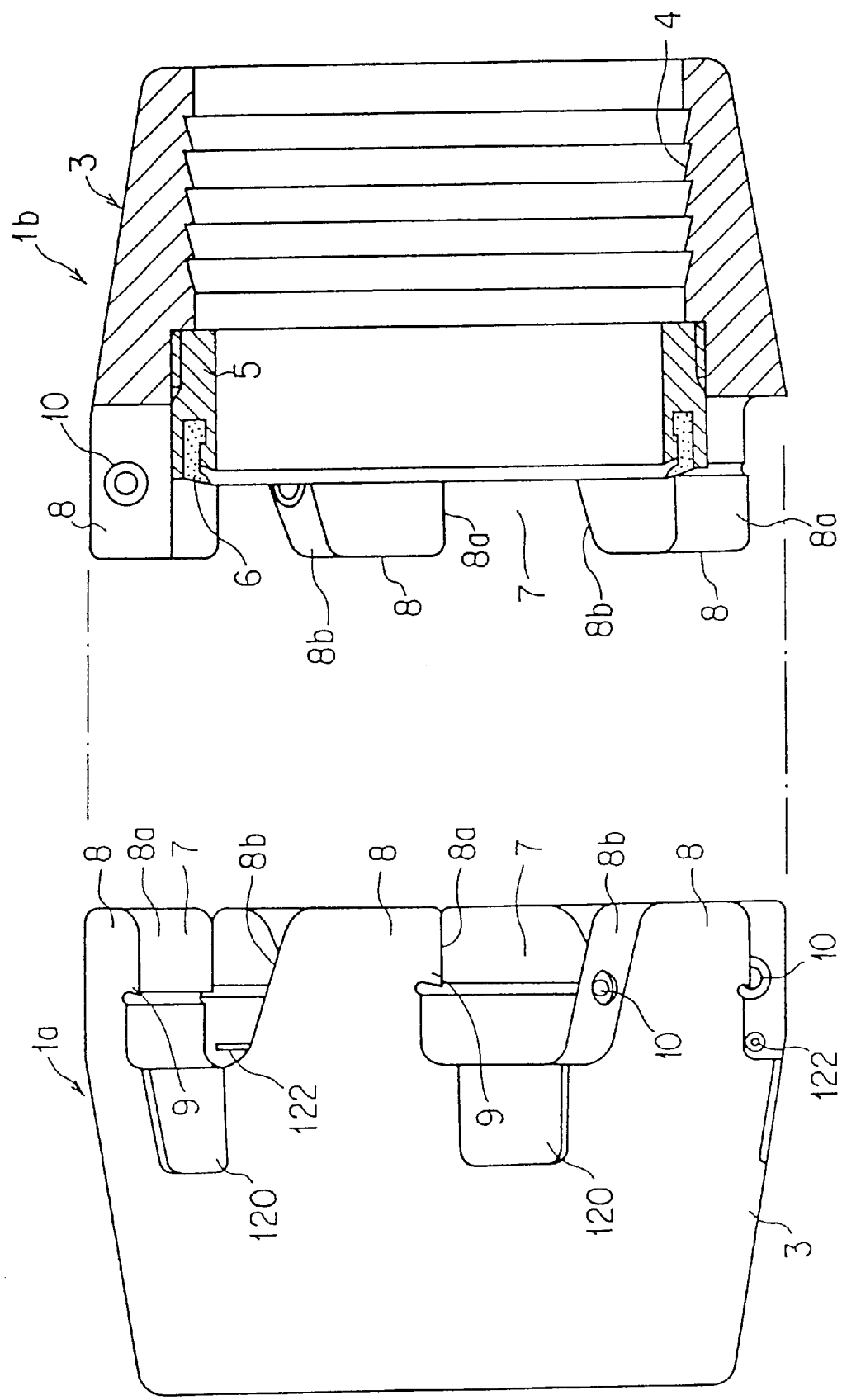
FIG. 2 shows a side view and a vertical cross-sectional view of the first embodiment.

Embodiments of the present invention will now be described with reference to the accompanying drawings. In these embodiments, a coupler apparatus of this invention is applied to a coupler for fire hoses. Needless to say, the coupler apparatus of this invention is not limited to a coupler for fire hoses, but is applicable general coupler apparatuses for other hoses, pipes, and other members.

FIGS. 1 to 7 show a first embodiment of the present invention. The coupler apparatus comprises a pair of coupler bodies 1a, 1b having the same structure. Fire hoses 2a, 2b are connected to the coupler bodies 1a, 1b, respectively.

Each coupler body 1a, 1b has a cylinder body 3 having a substantially cylindrical shape. A hose attachment portion 4 with sawtooth-shaped concaves and vexes is formed on an inner peripheral surface of the coupler body. An end portion of the fire hose 2a, 2b is inserted in the hose attachment portion 4, and an outer peripheral surface of the hose is pressed on the hose attachment portion 4 from an inner peripheral surface of the hose by means of a caulking ring (not shown). Thus, the fire hose is attached.

A cylindrical seal-face member 5 is screwed to an inner peripheral surface of a front end portion of the cylinder body 3. A front end face of the seal-face member 5 is formed as a seal face, and a seal member 6 such as a rubber packing is attached to the seal face. Accordingly, where the coupler bodies 1a, 1b are axially engaged and coupled, the seal members 6 thereof are abutted on each other, thereby effecting internal communication and seal between the cylinder bodies 3.

A plurality of engaging projections 8, for example, six engaging projections 8, are integrally provided on the front end portion of the cylinder body 3. The engaging projections 8 are disposed equidistantly in the circumferential direction and axially projected from the seal face of the seal-face member 5. Intervening portions among the engaging projections 8 are formed as engaging recesses 7. Where the coupler bodies 1a, 1b are axially abutted on each other, the engaging projections 8 of one coupler body 1a are engaged in the engaging recesses 7 of the other coupler body 1b, and the engaging projections 8 of said other coupler body 1b are engaged in the engaging recesses 7 of said one coupler body 1a. Thus, the engaging projections and recesses are engaged in a complementary manner.

In the first embodiment, the width of the engaging recess 7 is slightly greater than that of the engaging projection 8. Accordingly, the engaging projections 8 are axially engaged in the engaging recesses 7 and are circumferentially rotatable by a predetermined amount.

Figure 3:
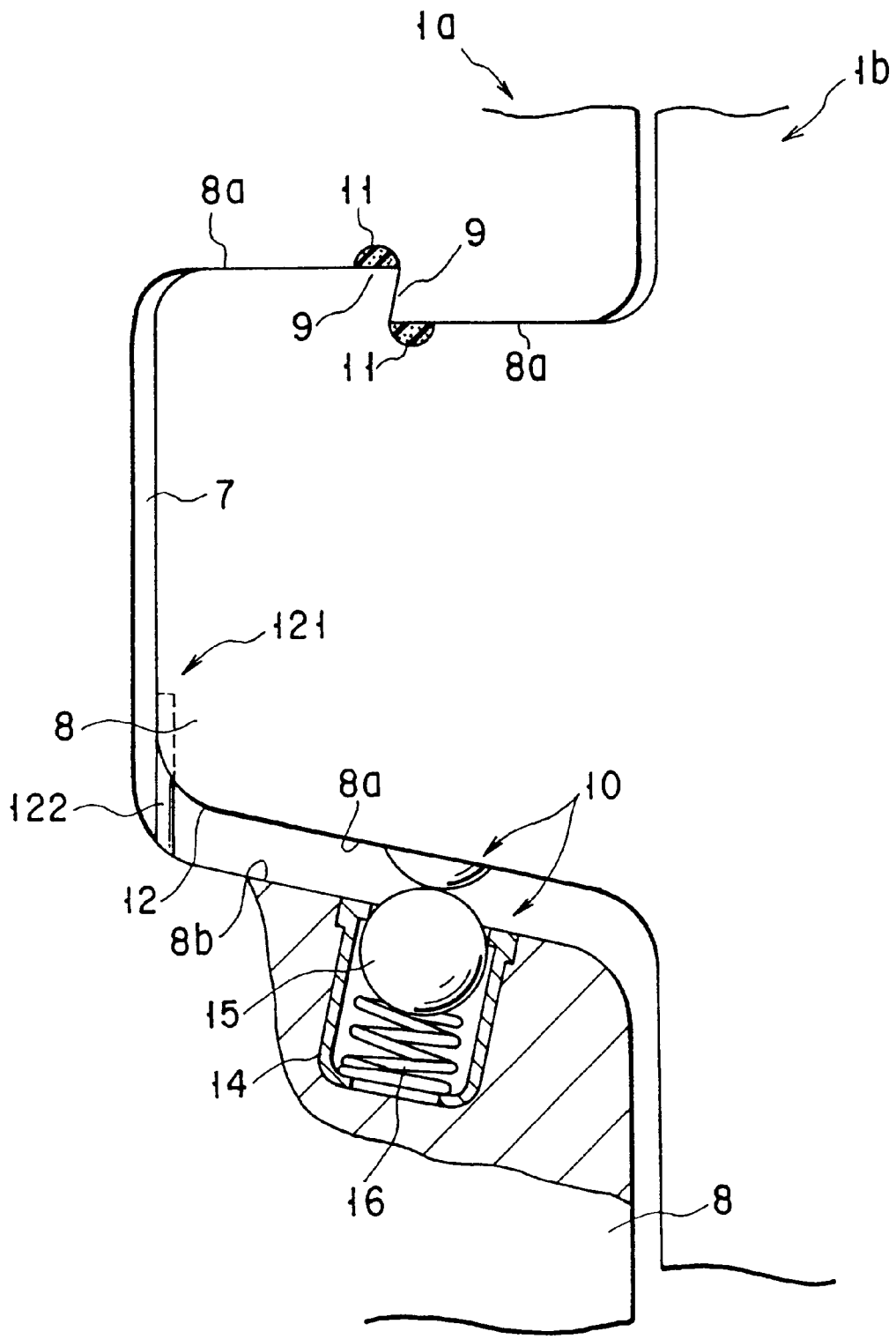
FIG. 3 is a plan view of a part of the first embodiment.

An engaging hook portion 9 with a stepped hook shape is formed in one side face of each engaging projection 8. Each engaging hook portion 9 is formed to be circumferentially engageable with the engaging hook portion of the mating engaging projection. Accordingly, in the state in which the engaging projections 8 are axially engaged with the associated engaging recesses 7, the coupler bodies 1a, 1b are rotated relative to each other. If said one side faces 8a of the mating engaging projections 8 are approached to each other, the engaging hook portions 9 are axially engaged, as shown in FIG. 3, and thus the coupler bodies 1a, 1b are coupled. A proximal end portion of each engaging hook portion 9 is provided with a curved portion 11 for preventing concentration of stress in this region. A distal-end corner portion of said other side face 8b of each engaging projection 8 is arcuated and provided with a guide portion 12. When the engaging projections and recesses are engaged, the mating guide portions 12 are put in contact.

An elastic plug body 11a of, e.g. elastic foamed material is filled and fixed in the curved portion 11. This prevents foreign matter such as sand or mud from accumulating in the curved portion 11 and hindering engagement of the engaging hook portions 9.

An urging mechanism 10 using a plunger mechanism is provided on said other side face 8b of each engaging projection 8. The urging mechanism 10 is a plunger mechanism comprising an urging member, e.g. a steel ball 15, projectably received in a cylindrical casing member 14, and a spring 16 for urging the steel ball 15 in its projecting direction. The urging mechanism 10 is buried in said other side face 8b of each engaging projection 8. If the engaging projection 8 is engaged in the associated engaging recess 7, as shown in FIG. 3, the mating steel balls 15 come in contact and urge each other so that said other side faces of the mating engaging projections 8 may move away from each other. As a result, said one side faces of the mating engaging projections 8 are urged to approach each other and the engaging hook portions 9 provided on said one side faces are engaged, as described above.

When the coupler bodies 1a, 1b are to be coupled, the coupler bodies 1a, 1b are opposed to each other in a substantially concentric manner, as shown in FIG. 1. The coupler bodies 1a, 1b are then axially abutted on each other and the engaging projections 8 are engaged in the associated engaging recesses 7. In this case, since the six engaging projections 8 have the same shape and are arranged equidistantly, these engaging projections 8 can be engaged with non-specified engaging recesses 7. Accordingly, in order to oppose the engaging projections 8 to the associated engaging recesses 7, it should suffice if the coupler bodies 1a, 1b are rotated relative to each other by about 30° at most. There is no need to excessively twist the fire hoses 2a, 2b connected to them, and the operation is easy.

When the coupler bodies are to be engaged, distal end portions of said one side faces 8a of the mating engaging projections 8 come in contact and a gap between said other side faces 8b decreases. However, since the distal-end corner portions of said other side faces are provided with the guide portions 12, the arcuated guide portions 12 come in contact and smoothly guide each other. Thus, at the time of engagement, standstill abutment between the end portions of engaging projections 8 is prevented. If the engaging projections 8 are axially engaged in this way, the steel balls 15 of urging mechanisms 10 provided on said other side faces 8b urge each other so that said one side faces of the engaging projections may approach each other. If the engaging hook portions 9 provided on said one side faces 8a have mutually run over the end portions of the associated engaging projections, the engaging hook portions 9 are circumferentially engaged by the urging force of the urging mechanisms 10, as shown in FIG. 3, and are made axially immovable. In this state, the paired coupler bodies 1a, 1b are coupled. It should be noted that in this state the seal members 6 are abutted on each other and deformed by a predetermined amount to maintain seal, as described above.

Where the coupled coupler bodies 1a, 1b are to be decoupled, the coupler bodies 1a, 1b are held by both hands and twisted in opposite directions. The coupler bodies 1a, 1b are thus rotated against the urging force of the urging mechanisms 10 and the engagement between the engaging hook portions 9 is released. Further, the coupler bodies 1a, 1b are axially pulled and decoupled.

According to the first embodiment, the paired coupler bodies 1a, 1b have the identical shape and dimensions. If the coupler bodies are attached to both ends of fire hoses and to the water supply port of the pump, they can be freely coupled without distinction between male and female. There is no possibility of erroneously coupling the coupler bodies by mistaking the male type and female type. Since single-type coupler bodies 1a, 1b with the identical structure may be manufactured, the cost is reduced.

In the first embodiment, a circumferential gap or play is provided between the engaging projection 8 and engaging recess 7 in the engaged state, a slight displacement may be permitted at the time of engagement and the operation is facilitated. In addition, the engagement is not disabled due to intervention of foreign matter such as sand, and the reliability is enhanced.

Where water pressure, etc. is acting in the coupler apparatus, a large axial load acts on the coupler bodies to move them away from each other. This load is received by the engaged hook portions. Accordingly, where pressure is acting in the inside, the coupling of the coupler apparatus is not undesirably released.

However, where pressure is not acting in the inside, the engagement between the engaging hook portions is maintained only by the urging force of the urging mechanisms, etc. If external shock or a twisting load applied from the hoses acts on the coupler bodies in the state in which the internal pressure is not acting, the coupler bodies may rotate relative to each other, the engagement between the engaging hook portions may be released, and the coupler bodies may be undesirably decoupled.

In order to overcome this drawback, the coupler apparatus is provided with a structure and a lock mechanism for preventing undesirable release of engagement, as will be described below.

Figure 4:
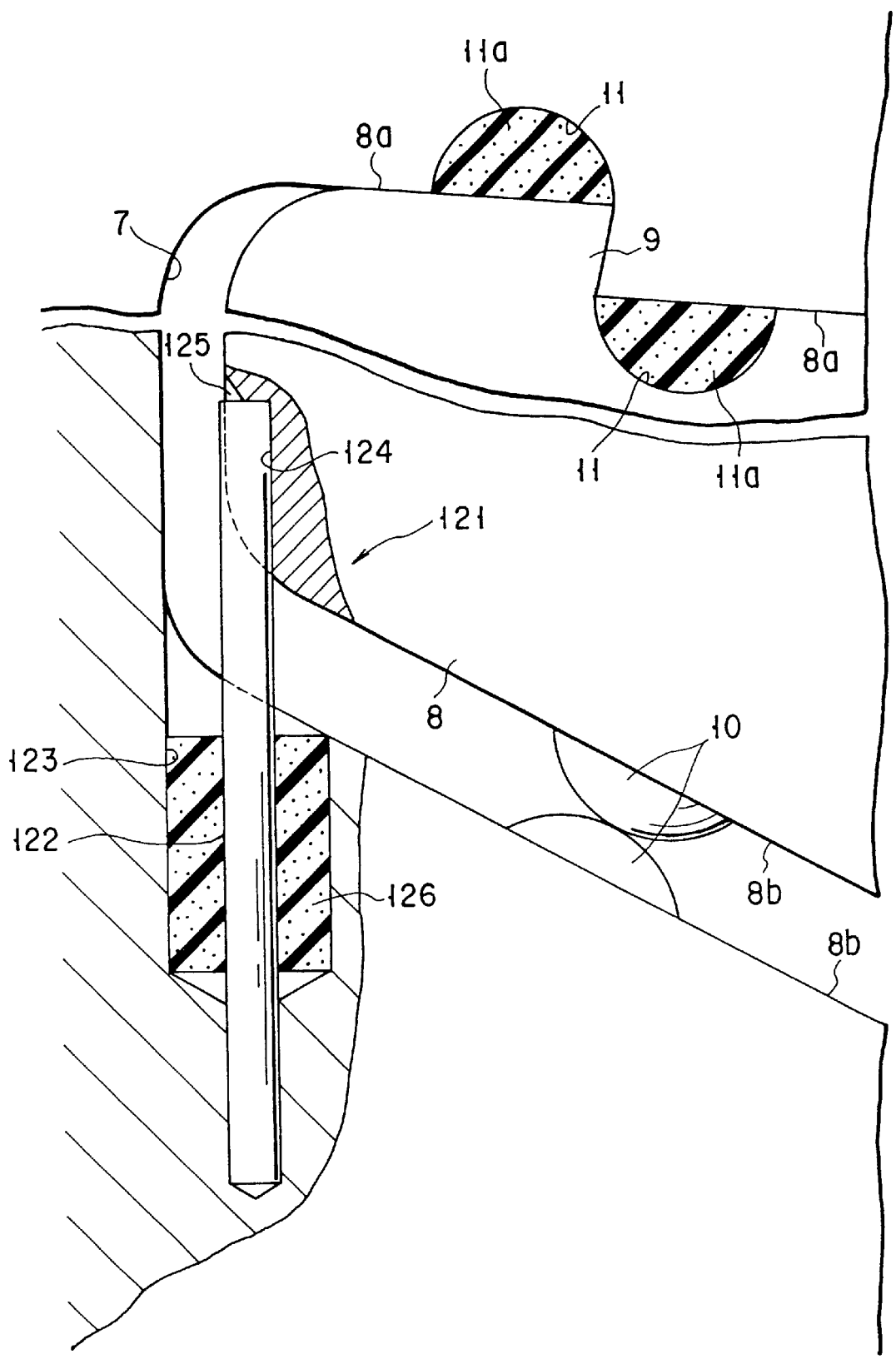
FIG. 4 is a plan view of a part of a lock mechanism, wherein a part of FIG. 3 is enlarged.
Figure 5:
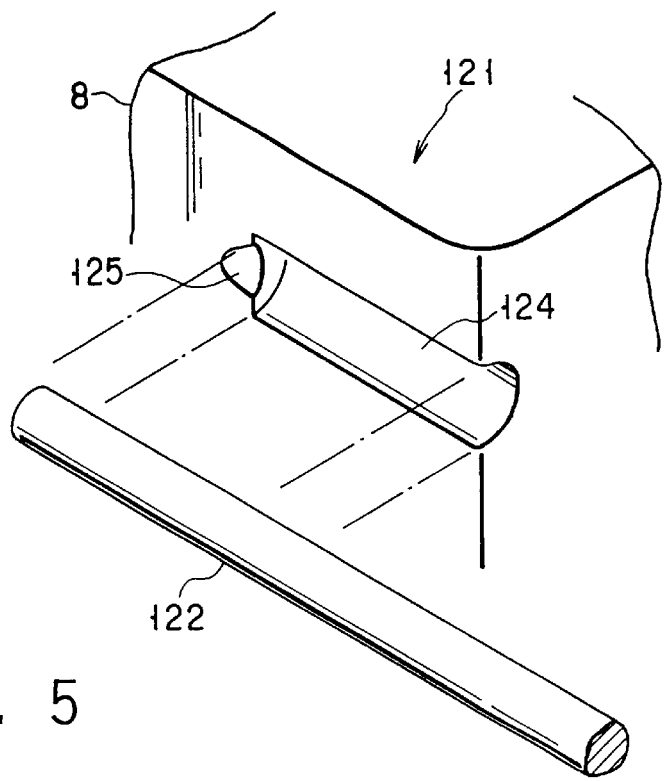
FIG. 5 is a perspective view of the lock mechanism.

FIG. 4 is an enlarged view of a part of the engaging projection 8. The dimensions of the respective portions are so set as to provide a gap between the distal-end face of the engaging projection 8 and the bottom wall of the engaging recess 7 in the state in which the engaging hook portions 9 are engaged. Accordingly, in the state in which the engaging hook portions 9 are engaged, the engaging projection 8 and the engaging recess 7 can be further moved to approach each other in the axial direction.

Said other side faces 8b of the engaging projections 8 are inclined in respect of the axial direction of the coupler bodies 1a, 1b. The engaging projection 8 is thus tapered, with its circumferential width decreasing toward its distal end portion. Similarly, the engaging recess 7 is tapered with its circumferential width decreasing toward its bottom portion. Thereby, engagement between the engaging projection 8 and engaging recess 7 is facilitated. Said one side face on which the engaging hook portion 9 is provided is formed to be substantially parallel to the axial direction of the coupler bodies 1a, 1b.

If the engaging projection 8 is engaged in the associated engaging recess 7, as shown in FIG. 3, the steel balls 15 of the urging mechanisms 10 come in contact and urge each other so that said other side faces of the engaging projections 8 may move away from each other. As a result, said one side faces 8a of the engaging projections 8 are urged to approach each other and the engaging hook portions 9 on said one side faces are urged and engaged, as described above. In this case, since said other side faces 8b of engaging projections 8 are inclined in respect to the axial direction, an axial component force occurs due to the reaction force of the urging mechanisms and this component force urges the engaging hook portions 9 to engage each other in the axial direction. Thereby, undesirable release of engagement is prevented when no internal pressure is acting in the coupler apparatus.

A plurality of tool grooves 120 are formed on outer peripheral surfaces of the coupler bodies 1a, 1b, as shown in FIG. 1. These tool grooves 120 are formed in a shape engageable with a tool such as a wrench. In case the coupling of the coupler bodies 1a, 1b cannot be released due to intervention of sand, etc., a tool such as a wrench is engaged in the tool groove 120 and the coupler bodies 1a, 1b are forcibly rotated. Thereby, the coupling can be released.

In addition, a lock mechanism 121 is provided on each coupler body, 1a, 1b in order to set the coupler bodies in the locked state. Undesirable release of coupling between the coupler bodies due to shock, etc. is prevented. The lock mechanism 121 will now be described with reference to FIGS. 4 to 6.

Specifically, a lock pin 122 is projected in a substantially circumferential direction at a bottom corner portion of the engaging recess 7, that is, at a proximal end portion of said inclined other side face 8b of the adjacent engaging projection 8. The lock pin 122 is formed of an elastic material, such as piano wire, with a diameter of about 3 mm. In the free state, the lock pin 122 is linear, but it can be resiliently bent. A clearance hole 123 having a greater diameter than the lock pin 122 is formed at the proximal end portion at which the lock pin 122 is projected, such that the lock pin 122 can be freely bent. An elastic plug body 126 formed of a soft material such as elastic foamed material, as in the above-described case, is filled and fixed in the clearance hole 123, thereby to prevent entrance of sand, mud, etc.

Lock pins 122 may be provided in all engaging recess 7, or only some of them. In the present embodiment, lock pins 122 are projectingly provided in every second engaging recess 7. Accordingly, three lock pins 122 are provided in each coupler body 1a, 1b.

Figure 12:
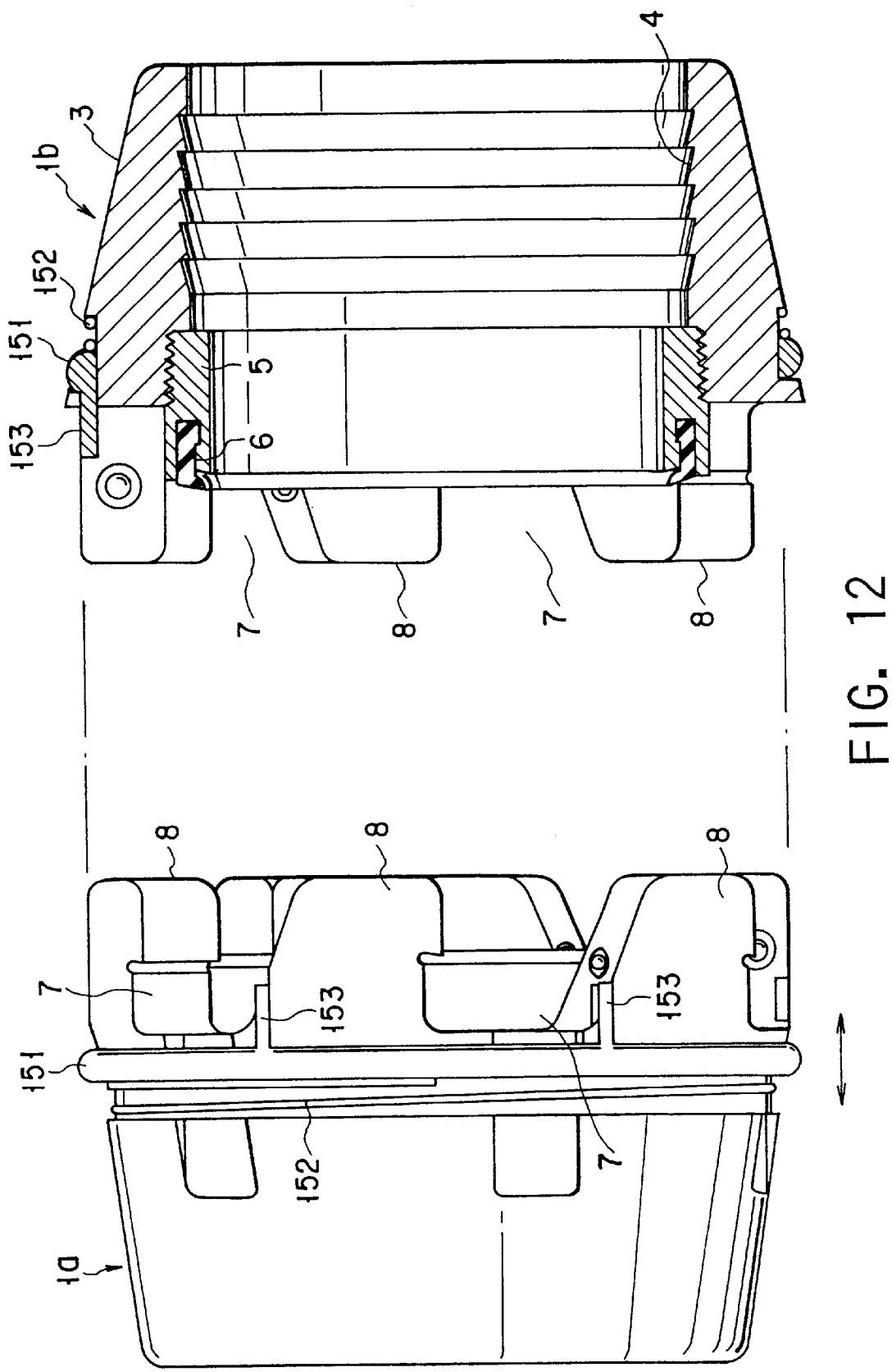
FIG. 12 shows a side view and a vertical cross-sectional view of a coupler apparatus according to a fourth embodiment.

A lock groove 124 is formed at a distal end face of the engaging projection 8 in association with the lock pin 122. The lock groove 124, as shown in FIG. 12, has one end opened to a corner of the engaging projection 8 and the other end defined to form a terminal bottom portion. This bottom portion is provided with a chamfer 125 for ensuring run-off of the lock pin 122 at the time of release. Lock grooves 124 are formed in distal end faces of all engaging projections 8. Accordingly, even if the engaging projections 8 and engaging recesses 7 are engaged in a given relationship, the lock pins 122 are always associated with the corresponding lock grooves 124.

Figure 6:
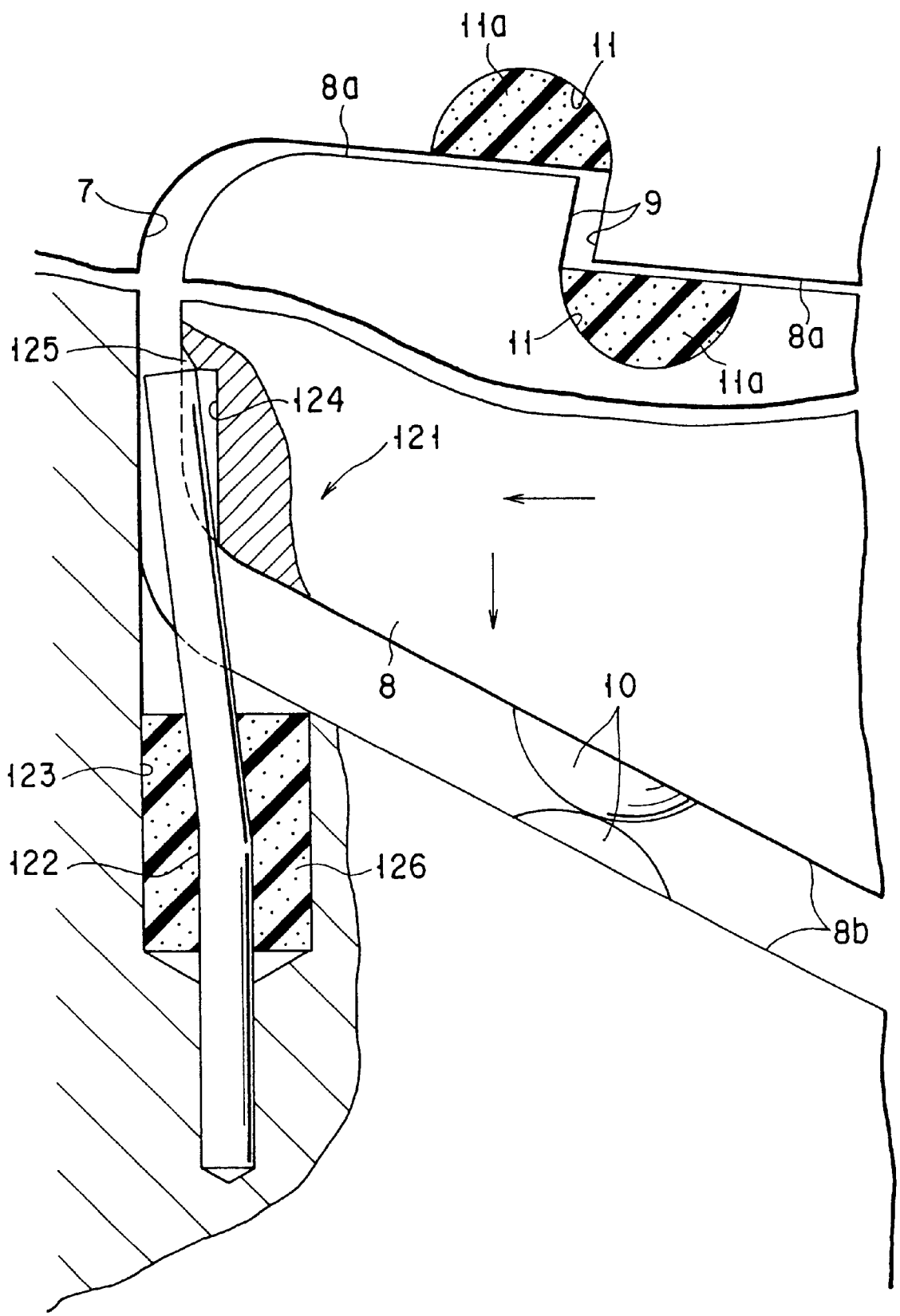
FIG. 6 is a plan view of the part of the lock mechanism in the lock release state.
Figure 13:
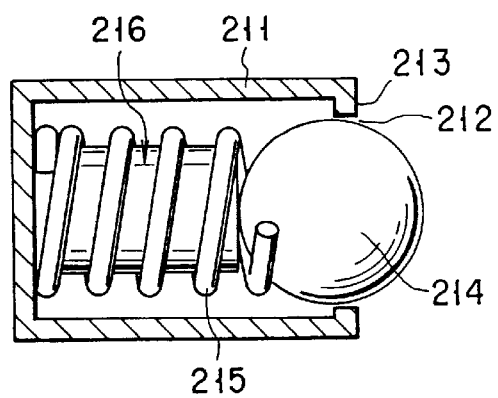
FIG. 13 is a vertical cross-sectional view of a plunger of an urging mechanism according to a fifth embodiment.

If the engaging projection 8 is put in the engaging recess 7 and the engaging hook portions 9 are engaged, the lock pin 122 of the lock mechanisms 121 is engaged in the lock groove 124 formed at the distal end face of the engaging projection 8 and the distal end of the lock pin 122 abuts upon the terminal bottom portion of the lock groove 124. Accordingly, in this state, the coupler bodies 1a, 1b are locked to be unrotatable in the circumferential direction in which the engaging hook portions 9 are disengaged from each other.

Where the lock mechanism 121 is released, as shown in FIG. 6, the couplers 121 are axially pressed to approach each other. If the engaging projection 8 axially moves toward the bottom of the engaging recess 7, as shown in FIG. 13, the lock pin 122 is pressed by the distal end face of the engaging projection 8 and resiliently bent. Consequently, the distal end portion of the lock pin 122 runs out of the bottom of the lock groove 124 and the locked state is released. Thus the coupler bodies 1a, 1b are rendered circumferentially rotatable. If the coupler bodies 1a, 1b are circumferentially rotated in this state, the engaging hook portions 9 are disengaged and accordingly the coupler bodies 1a, 1b are disengaged. In this case, since the chamfer 125 is formed at the bottom of the lock groove 124, the distal end portion of the lock pin 122 is not caught by the bottom of the lock groove 124, and the lock release is ensured.

Figure 7:
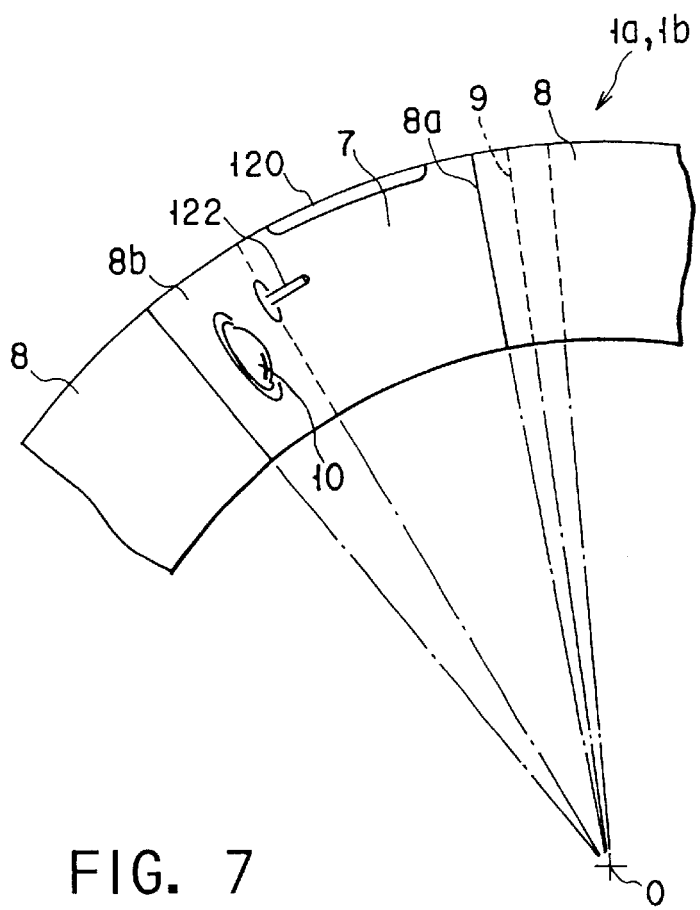
FIG. 7 is a front view of a part of a coupler body.

In this coupler apparatus, in order to make smooth and sure the engagement of coupler bodies 1a, 1b, all side faces or inner side faces 8a, 8b of the engaging projections 8 or engaging recess 7 are defined by radially extending planes passing through the center axis of the coupler body 1a, 1b. Specifically, as shown in FIG. 7, said one and other side faces of the engaging projection 8 (inner faces of the engaging recess 7) and faces constituting the engaging hook portions 9 are all defined by radially extending planes passing through a center axis O of the coupler body 1a, 1b.

In the description of this embodiment, the side faces 8a, 8b are described as being defined by radially extending planes passing through the center axis of the coupler body 1a, 1b. In the actual product, needless to say, these side faces need not exactly be defined by radially extending planes which geometrically exactly pass through the center axis. Thus, in consideration of conditions such as smoothness of engagement of the actual product, operability and machining, the faces constituting the side faces 8a, 8b may be defined by substantially radially extending planes which pass through the vicinity of the center axis.

When the coupler bodies 1a, 1b are engaged, said one side faces 8a or said other side faces 8b of engaging projections 8 are mutually engaged. Since these side faces are defined by radially extending planes passing through the center axis of the coupler body 1a, 1b, as described above, no unnecessary gap is created therebetween. The gap between the associated side faces can be reduced to a minimum necessary for smooth engagement. Therefore, smooth engagement/disengagement of the coupler apparatus is not prevented by sand, pebbles, etc. which may enter the gap.

At the time of engagement, urging force of the urging mechanisms 10 or reaction force, etc. due to contact of the side faces 8a, 8b and engaging hook portions 9 will act. In this case, the side faces 8a, 8b and engaging hook portions 9 are all defined by radially extending planes passing through the center axis O of the coupler body 1a, 1b. Accordingly, component force of this reaction force or urging force will basically act only in the circumferential or axial direction. At the time of engagement, no such component force will occur, as will radially displace the coupler bodies 1a, 1b. Therefore, at the time of engagement, only axial and circumferential force acts on the coupler bodies 1a, 1b, and displacement or inclination of center axes of the coupler bodies can be prevented without fail, and smooth and sure engagement is achieved.

In this embodiment, since said other side faces 8b are inclined, direction in which mutual reaction force acts on the side faces 8b and urging force of the urging mechanisms provided at the side faces 8b acts become complex. However, since said side faces 8b, too, are defined by the radially extending planes, as described above, the component force will act only in the axial and circumferential direction. Therefore, smooth and sure engagement is achieved.

The smoothness at the time of the above-described engagement or disengagement is influenced by the shapes and dimensions of the engaging projection 8 and engaging recess 7 and the gap therebetween. The actual product is properly designed through use of many prototypes under various conditions. The feature that the component force of the reaction force or urging force acts basically in the axial and circumferential directions alone will greatly contribute to the smoothness of the engagement and disengagement.

Figure 8:
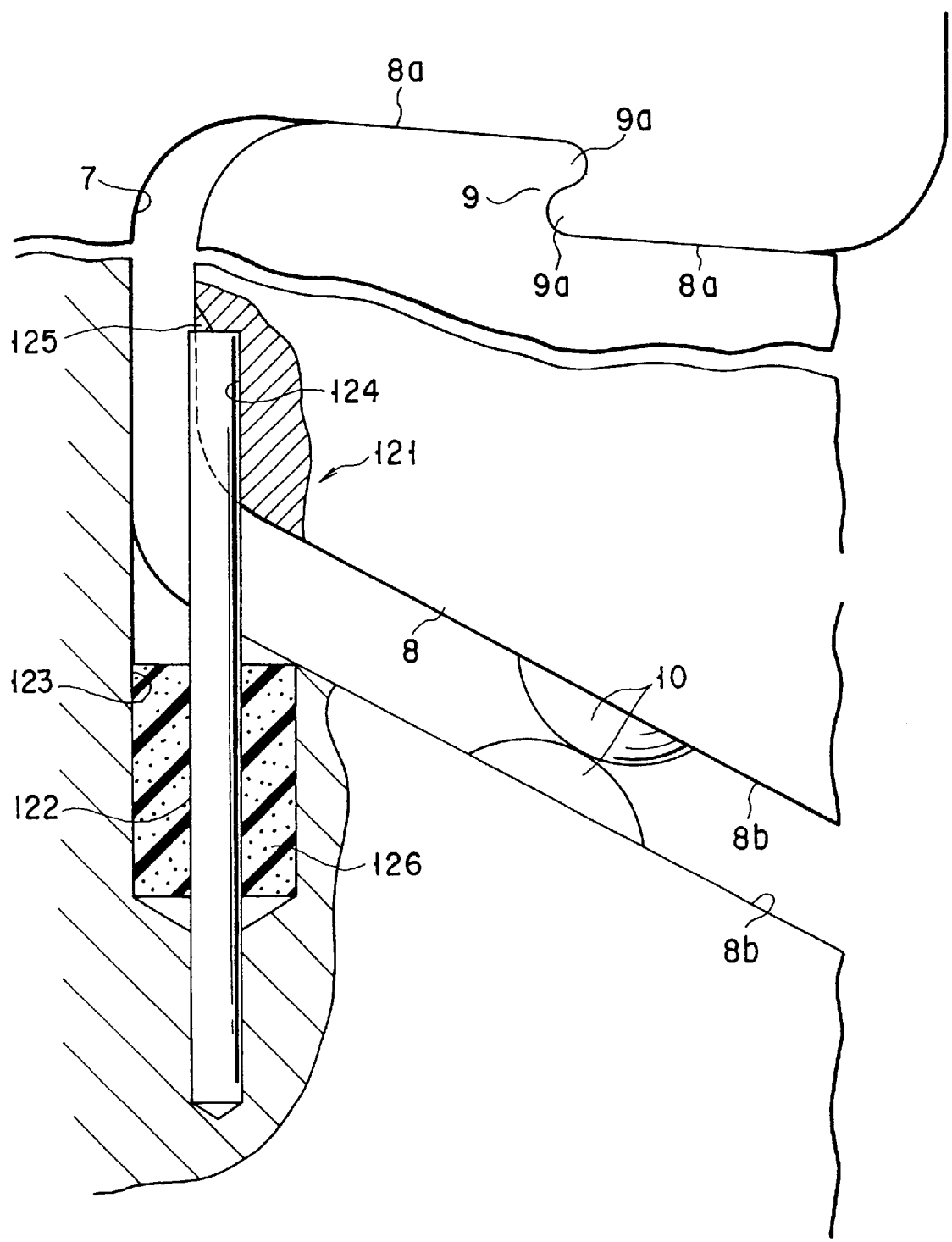
FIG. 8 is a plan view of a part of a lock mechanism according to a second embodiment.

FIG. 8 shows a lock mechanism of a coupler according to a second embodiment of the present invention. In this embodiment, the engaging hook portions 9 are shaped to have projecting portions 9a which are axially engaged. The engagement of these projecting portions 9a is not released unless the coupler bodies 1a, 1b are axially moved from the engaged state to approach each other by a predetermined distance. This structure cooperates with the above-described lock mechanism 121 to prevent undesired disengagement more exactly. Apart from this feature, the second embodiment and the above-described sixth embodiment are common in structure. The elements shown in FIG. 8, which correspond to the first embodiment, are denoted by like reference numerals and a description thereof is omitted.

Figure 9:
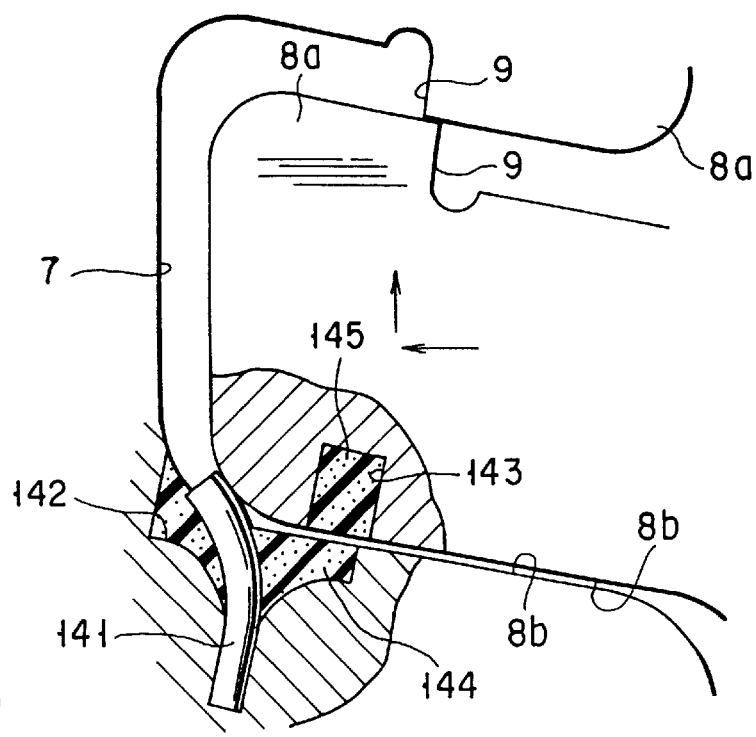
FIG. 9 is a plan view of a part of a lock mechanism according to a third embodiment.
Figure 10:
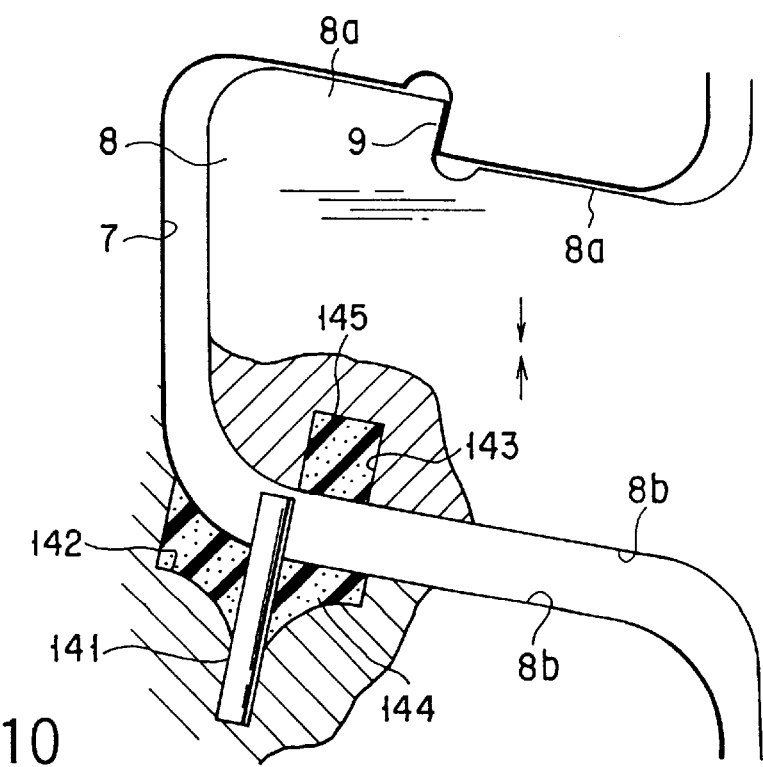
FIG. 10 is a plan view of the part of the lock mechanism according to the third embodiment in another state.
Figure 11:
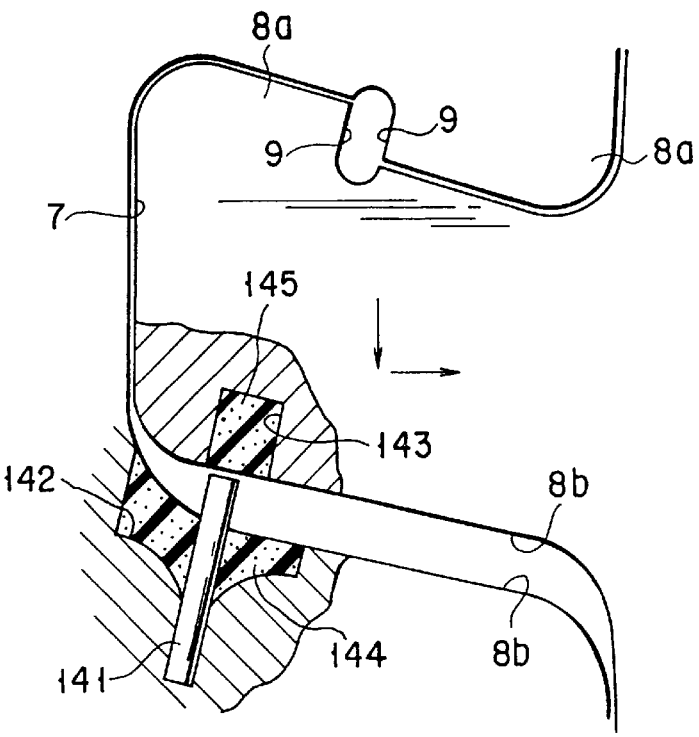
FIG. 11 is a plan view of the part of the lock mechanism according to the third embodiment in another state.

FIGS. 9 to 11 show a lock mechanism according to a third embodiment of the present invention. In this embodiment, a resiliently bendable lock pin 141 is projected in a substantially circumferential direction from an inner-side bottom portion of the engaging recess 7, that is, a proximal end portion of said other side face 8b of engaging projection 8. The lock pin 141 is formed of a material with a high elasticity such as a superelastic material. The lock pin 141 is linear in the free state and is resiliently bendable. A large-diameter clearance hole 142 is formed at the proximal end portion from which the lock pin 141 is projected so that the lock pin 141 can freely be bent.

A release hole 143 is formed at a distal end portion of said other side face 8b of engaging projection 8 in association with the lock pin 141. In the state in which the engaging hook portions 9 are engaged, the position of the release hole 143 does not correspond to the distal end of the lock pin 141 and remains near the lock pin 141. Elastic plug bodies 144, 145 of soft material such as elastic foamed material are filled and fixed in the clearance hole 142 and release hole 143, thereby to prevent accumulation of foreign matter such as sand or mud therein. Apart from this feature, the third embodiment and the above-described first embodiment are common in structure. The elements shown in FIGS. 9 to 11, which correspond to the first embodiment, are denoted by like reference numerals and a description thereof is omitted.

In this embodiment, at the time of engagement, as shown in FIG. 9, the lock pin 141 is bent to permit engagement between the engaging recess 7 and engaging projection 8. In the state in which the engaging hook portions 9 are completely engaged, as shown in FIG. 10, the lock pin 141 restores to its linear shape by its own elasticity and a distal end portion thereof abuts on the side face 8b of the engaging projection 8. Thus, the coupler bodies 1a, 1b are locked to be unrotatable relative to each other.

Where the lock is released, the coupler bodies 1a, 1b are axially moved to approach each other, and the distant end portion of the lock pin 141 corresponds to the release hole 143, as shown in FIG. 11. In this state, the distal end portion of the lock pin 141 can enter the release hole 143 and the coupler bodies 1a, 1b are rendered circumferentially rotatable. Accordingly, the lock is released.

FIG. 12 shows a lock mechanism according to a fourth embodiment. In this embodiment, an annular lock member 151 which is axially movable is provided on the coupler body 1a, 1b. The lock member 151 is urged by a spring 152 to axially move toward a distal end of the coupler 1a, 1b.

Lock claws 153 corresponding to the respective engaging recesses 7 are projected from a front end portion of the lock member 151. The lock claw 153 has a width which is slightly narrower than a gap created between said other side faces 8b of engaging projections 8 in the state in which the engaging projection 8s is engaged in the engaging recess 7 and the engaging hook portions 9 are completely engaged. The lock claw 153 projects into the engaging recess 7 along the proximal end portion of the side face 8b. Apart from this feature, the fourth embodiment and the above-described first embodiment are common in structure. The elements shown in FIG. 12, which correspond to the first embodiment, are denoted by like reference numerals and a description thereof is omitted.

In this embodiment, if the engaging projection 8 is engaged in the engaging recess 7, a distal end potion of the lock claw 153 abuts on the distal end portion of the engaging projection 8 and the lock claw 153 is pressed by the engaging projection 8. The lock claw 153 along with the lock member 151 is retreated against the force of the spring 152. If the engaging projection 8 is engaged in the engaging recess 7 and the engaging hook portions 9 are completely engaged so that a predetermined gap is created between said other side faces 8b, the lock claw 153 is advanced by the urging force of the spring 152 and enters the gap. Thereby, the coupler bodies are locked to be unrotatable relative to each other. Where the lock is released, the lock members 151 are held by the hands and retreated against the force of the springs 152. Thus, the lock claw 153 is pulled out of the gap between said other side faces 8b and the lock is released.

In this embodiment, the state of the lock mechanism can be observed from the outside by the naked eyes. Accordingly, it is easily confirmed whether the coupler bodies 1a, 1b are completed engaged and locked. Moreover, the structure is simple, the reliability is high and the operation is easy.

As the above-described lock mechanism, a fifth embodiment will be described wherein plunger mechanisms as shown in FIGS. 13 to 20 are used as the urging mechanism 10.

Figure 14:
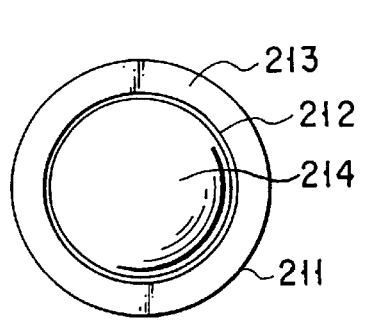
FIG. 14 is a front view of the plunger shown in FIG. 13.
Figure 15:
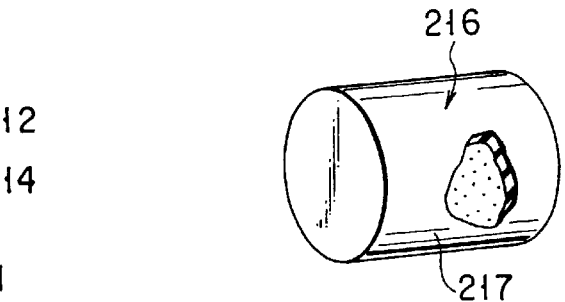
FIG. 15 is a perspective view of a viscous body of the plunger shown in FIG. 13.

FIG. 13 is a vertical cross-sectional view of the plunger mechanism, FIG. 14 is a front view thereof, and FIG. 15 is a partially broken perspective view of a viscous body. A plunger body 211 comprises a metallic cylindrical body having an opening portion 212 at an end face thereof. An inwardly bent flange 213 is provided at the opening portion 212. A steel ball 214 serving as an engaging portion projectable from the opening portion 212 is provided in the plunger body 211. An inside diameter of the opening portion 212 is set to be slightly less than a diameter of the ball 214 by the flange 213 so that part of the ball 214 can project from the opening portion 212 but the entire ball 214 may not project.

A coil spring 215 which is axially extendible/compressible is put in the plunger body 211. One end portion of the coil spring 215 abuts on an inner bottom of the plunger body 211, and the other end portion thereof abuts on the ball 214 and urges the ball 214 in such a direction as to project from the opening portion 212.

A viscous body 16 is put in an inside space of the coil spring 215. The viscous body 216 is a viscoelastic fluid, represented by, e.g. a dilatant fluid or a putty-like silicone bound fluid, filled in a cylindrical elastic bag 217 of rubber, etc. The viscoelastic fluid is such a substance that when slow (low-speed) relative movement acts on the plunger body 211 and ball 214, the resistance varies slightly, whereas when quick (high-speed) relative movement acts, the apparent viscosity progressively increases in a nonlinear fashion and high rigidity is exhibited.

Figure 16:
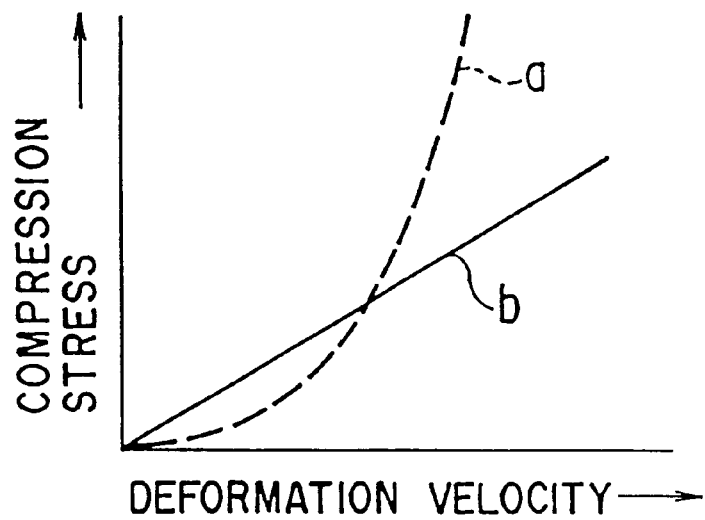
FIG. 16 is a graph showing characteristics of the plunger shown in FIG. 13.

The dilatant fluid serving as the viscous body 216 is a non-Newtonian fluid which does not depend on time. A compression stress/deformation velocity relation in linear coordinates is indicated by a curve a in FIG. 16. As the deformation velocity increases, the apparent velocity increases and a dilatant flow is exhibited. In FIG. 16, a straight line b indicates characteristics of a Newtonian fluid. In this phenomenon, a rheologic flow which is essentially reverse to a plastic flow is exhibited. More specifically, in the dilatant fluid, liquid functions as lubricant among mutually passing solid particles. Where a relative movement velocity between the plunger body 111 and ball 114 is low, force necessary for causing motion may be small and flow occurs freely. On the other hand, where a relative movement velocity between the plunger body 111 and ball 114 is high, tightly filling among solid particles is lost, and as a result the volume occupied by substance increases.

In other words, where the ball 114 is pressed into the plunger body 111 at low speed, the viscous body 116 deforms in accordance with the compression of the coil spring 115 and relative movement between the plunger 111 and ball 114 is permitted. Where the ball 114 is pressed into the plunger body 111 at high speed by shock, etc., the compression stress (stress due to force applied in the direction of compression) of the viscous body 116 considerably increases. Consequently, reaction force (force with rigid-body type elastic modulus) occurs to the movement of the ball 114 and this is constrained. Thus, the ball 114 does not enter deep into the plunger, nor does the coil spring 115 compress.

Where this plunger mechanism is used as the urging member 10 of the above-described coupler apparatus, if a shock-like load acts on the coupler apparatus to instantaneously rotate the coupler bodies 1a, 1b relative to each other, a great resistance occurs in the plunger mechanism. Accordingly, in such a case, the coupler bodies 1a, 1b do not rotate relative to each other and the engaging hook portions 9 are not undesirably disengaged.

This plunger mechanism is applicable not only to the shock-resistant lock mechanism but to various uses.

Figure 17:
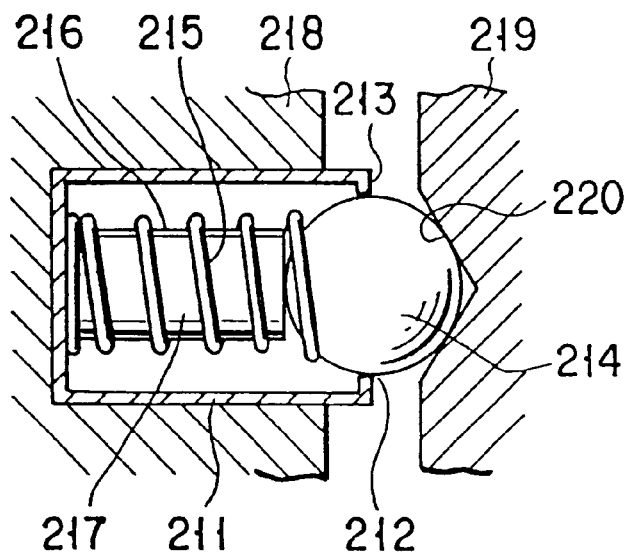
FIG. 17 is a vertical cross-sectional view showing a mounted state of the plunger shown in FIG. 13.

For example, this shock-resistant plunger mechanism is applicable to mating faces of a fixed die and a movable die, various couplers, jigs for positioning drill holes, torque limiters, and mechanical elements for, for example, finding rotational angles of turntables. As is shown in FIG. 17, for example, the plunger body 211 is fixed to one member 218, and a conical engaging hole 220 for engagement with the ball 214 is provided on the other member 219. If the ball 214 is resiliently engaged in the engaging hole 220, the first and second members 218 and 219 are engaged.

Where the ball 214 is pressed into the plunger body 211 at high velocity due to an impact of drop, etc. in the state in which the first and second members 218, 219 are engaged, the compressive stress of the viscous body 216 greatly increases. Consequently, reaction force (force with rigid-body type elastic modulus) occurs to the movement of the ball 114 and this is constrained. Thus, the ball 114 does not enter deep into the plunger, nor does the coil spring 115 compress. Therefore, the engaged state of the first and second members 218, 219 is maintained.

Figure 18:
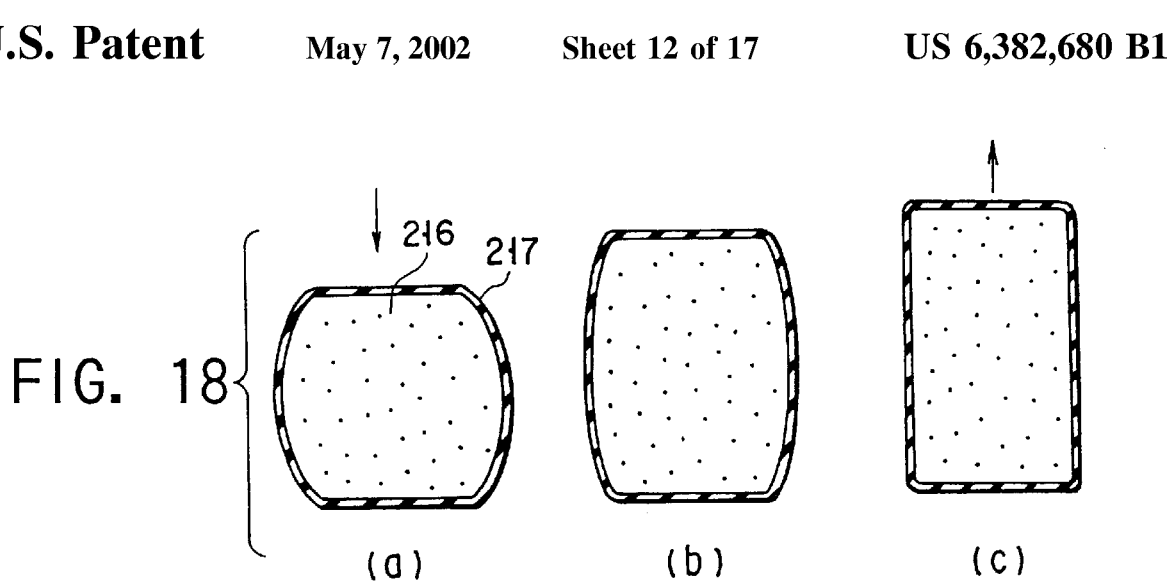
FIG. 18 shows cross-sectional views illustrating an operation of the viscous body.

An additional description will now be given of the viscous body 216, that is, the viscoelastic fluid, represented by, e.g. a dilatant fluid or a putty-like silicone bound fluid, filled in the cylindrical elastic bag 217 of rubber, etc. The viscous body 216 is a "incompressive fluid" whose volume is substantially unchanged under pressure. In FIG. 18, the viscous body 216 is filled in the cylindrical elastic bag 217 of rubber, etc. In the natural state without application of external force, it has a shape as shown in (a). If external force (arrow) is applied in the direction of compression, as in (b), the viscous body contracts in the axial direction and expands in the radial direction, with no change of volume. The viscous body 216 has no restoring force. Unless external force (arrow) in a direction of pulling, as in (c), it neither extends in the axial direction nor contracts in the radial direction.

Figure 19:
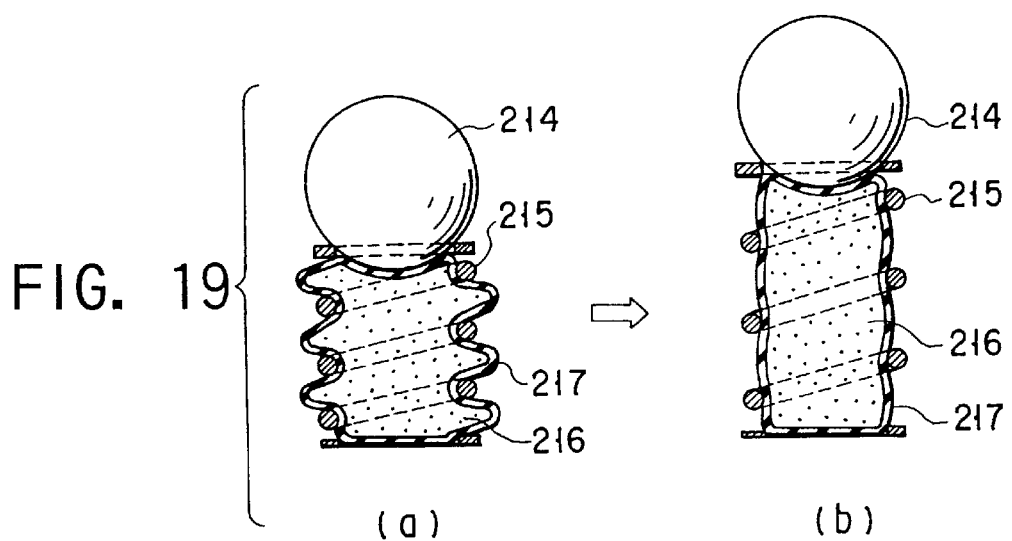
FIG. 19 shows cross-sectional views illustrating another operation of the viscous body.
Figure 20:
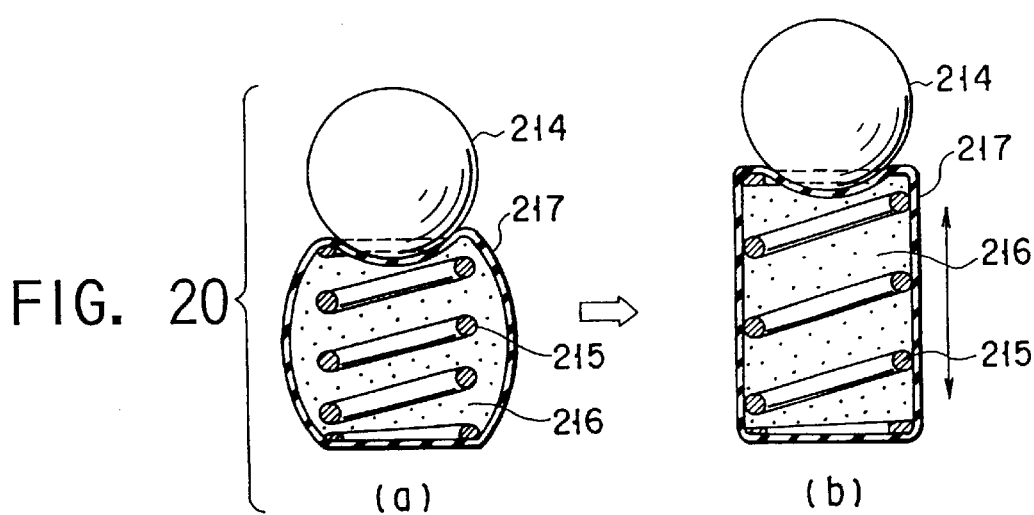
FIG. 20 shows cross-sectional views illustrating another operation of the viscous body.

Accordingly, where the viscous body 216 is accommodated in the inner space of the coil spring 215, as shown in FIG. 19 and force acts on the ball 214 to compress the coil spring 15, as in (a), the coil spring 215 is compressed. In addition, force acts on the inside viscous body 216 in the direction of compression. As a result, the elastic bag 217 expands in the radial direction and bulges out among the turns of the coil spring 215. If the force acting on the ball 214 is lost, the elastic bag 217 extends in the axial direction, as in (b), by the restoring force of the coil spring 215, and it contracts in the radial direction.

The same applies to a case where the viscous body 216 as well as the coil spring 215 is accommodated in the cylindrical elastic bag 217 of, rubber, etc. Where force acts on the ball 214 to compress the coil spring 215, as in (a), the coil spring 215 is compressed. In addition, force acts on the inside viscous body 216 in the direction of compression. As a result, the elastic bag 217 expands in the radial direction and bulges out away from the outer periphery of the coil spring 215. If the force acting on the ball 214 is lost, the elastic bag 217 extends in the axial direction, as in (b), by the restoring force of the coil spring 215, and it contracts in the radial direction.

Accordingly, the elastic bag 217 accommodating the viscous body 216 may be provided inside the coil spring 215, or the viscous body 216 and coil spring 215 may be provided within the elastic bag 217.

In the above embodiment, the elastic bag 217 accommodating the viscous body 216 is used. Instead, a cylindrical body of sponge, etc. impregnated with, e.g. a dilatant fluid or a putty-like silicone bound fluid may be used.

Figure 21:
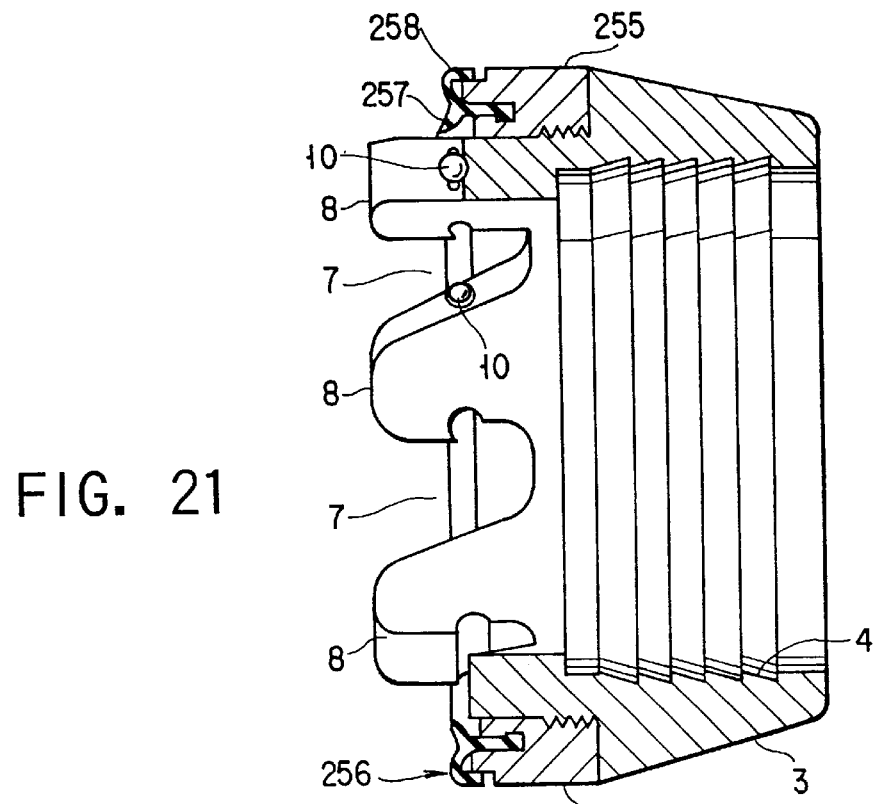
FIG. 21 is a vertical cross-sectional view of a coupler body according to a sixth embodiment.

FIG. 21 shows a coupler according to a sixth embodiment of the present invention. In this embodiment, an outside seal-face member 255 is attached to an outer peripheral portion of the cylinder body 3. A distal end face of the outside seal-face member 255 is formed as a seal face, and an annular seal member 256 is attached to this distal end face.

In this embodiment, the seal member 256 is disposed to surround the outside of the engaging projections 8 and engaging recesses 7. Accordingly, in the state in which the coupler bodies are engaged, the engaging projections 8, etc. are protected by the seal member 256 and entrance of sand, mud, etc. among the engaging projections 8 and engaging recesses 7 is prevented. Thus, sand, mud, etc. is prevented from being caught among them.

In order to achieve this purpose, the seal member 256 has a boot portion 258 having a substantially U-shaped cross section for preventing entrance of sand, mud, etc., which is disposed on the outside of a lip portion 257 for maintaining watertightness.

Figure 22:
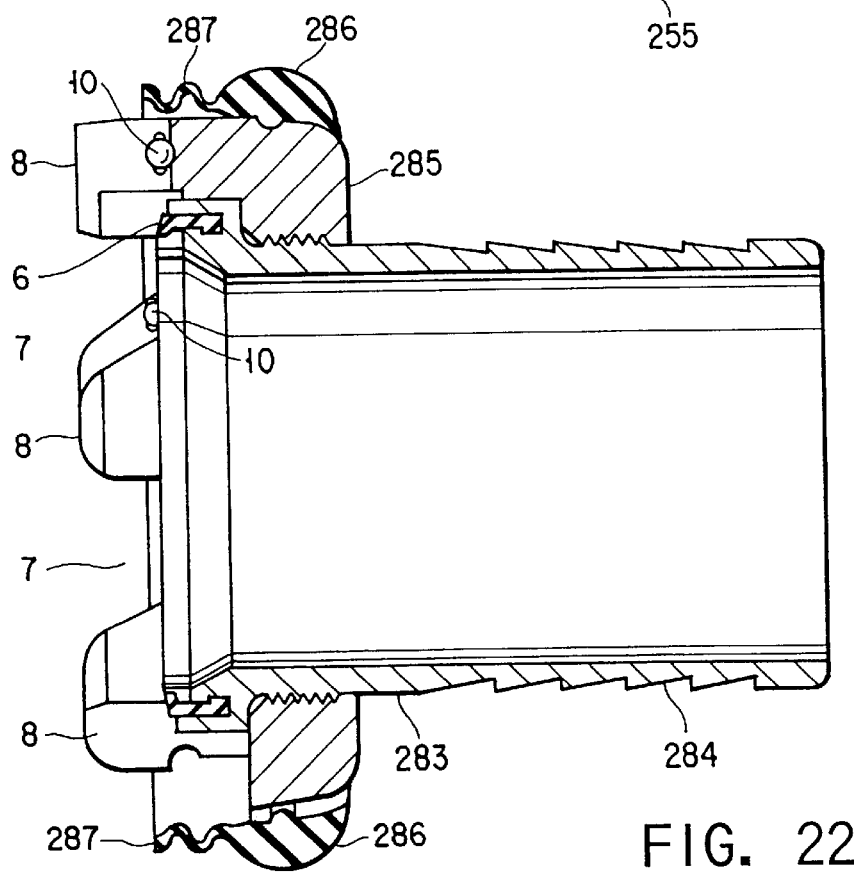
FIG. 22 is a vertical cross-sectional view of a coupler body according to a seventh embodiment.

FIG. 22 shows a coupler apparatus according to a seventh embodiment of the present invention. In this embodiment, a hose attachment portion 284 comprising a plurality of ridges with a sawtooth cross section is formed on an outer peripheral surface of the cylinder body 283. A hose, not shown, is tightly fitted on an outer periphery of the hose attachment portion 284 and the hose is clamped by a clamp ring (not shown) from outside.

In this embodiment, a ring member 285 is screwed on the outer periphery of the cylinder body 283. The aforementioned engaging projections 8 and engaging recesses 7 are formed at a distal end portion of the ring member 283. A rubber boot member 286 for preventing sand, mud, etc. from being caught between the engaging projections 8 and engaging recesses 7 is attached to the outer periphery of the ring member 285. The boot member 286 has a substantially cylindrical shape, and a bellows portion 257 is formed at a distal end portion thereof.

A method of machining the coupler body 1a, 1b will now be described with reference to FIG. 23.

As regards the coupler body 1a, 1b, as described above, the side faces of the engaging projection 8 and engaging recess 7 are defined by radially extending planes passing through the center axis of the coupler body 1a, 1b. These engaging projection 8 and engaging recess 7 are formed by cutting the front end face of the coupler body 1a, 1b by means of a milling machine, etc. However, if an ordinary milling machine is used, these side faces are cut in parallel to one another.

Figure 23:
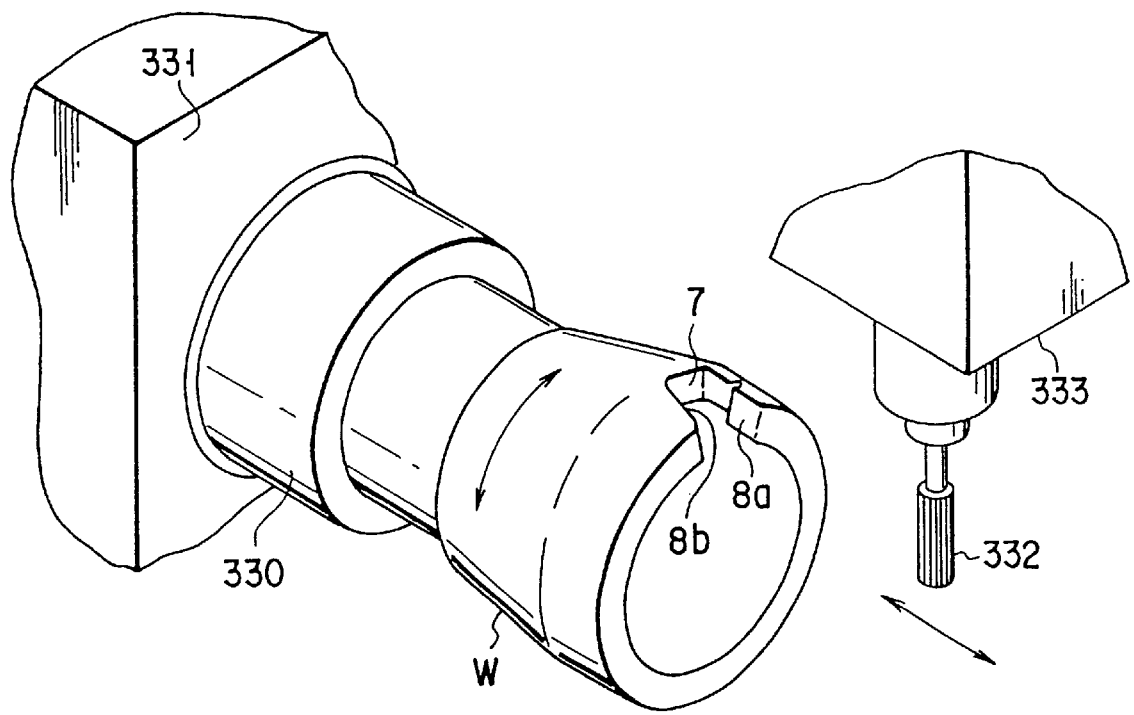
FIG. 23 is a perspective view illustrating a method of machining the coupler body.

In order to overcome this problem, the cutting process is carried out by a method as illustrated in FIG. 23. A substantially cylindrical work W constituting the coupler body 1a, 1b is mounted on a work hold member 330 of a work hold bed mechanism 331. The work hold bed mechanism 331 can rotate the work W about its center axis or X-axis, i.e. by a given angle in A-axis. A bed for a conventional milling machine can be used. A milling tool 332 is mounted on a tool head 333. The milling tool 332 is disposed in a direction crossing the X-axis or the center axis of the work W. The tool head 333 can freely move the milling tool 332 in a direction along the center axis of the work W. A machine head of a conventional milling machine, etc. can be used.

While the work W is being rotated, the milling tool 332 is moved in the axial direction and the cutting point of the milling tool 332 is moved along a contour of the engaging recess 7 (contour of engaging projection 8). The engaging recess 7 is cut at the distal end portion of the work W, and both side faces 8a, 8b, engaging hook portions 9, etc. are formed.

If machining for one engaging recess 7 is completed, the work W is rotated by a predetermined angle and the next engaging recess 7 is similarly machined. Thus, all engaging recesses 7 are formed, and engaging projections 8 are formed among them.

In the actual machining, where the center axis of the milling tool 332 is made to coincide with the radial direction crossing the center axis of the work W, the cutting point of the milling tool 332 is displaced in the circumferential direction of the work W by a degree corresponding to the radius thereof. In addition, where a face inclined to the X-axis of the work W, such as said other side face 8b, or an arcuated portion, is cut by the milling tool 332, the degree of displacement of the cutting point in the circumferential direction is further varied. To correct the displacement, the tool head 333 is constructed to be movable in the Y-direction or a direction intersecting at right angles with the x-axis of the work W. Thus, the displacement due to the radius of the milling tool 332 or the direction of cutting movement is corrected.

According to this manufacturing method, when the side faces 8a, 8b are cut, the cutting point of the milling tool 332 is always directed to the center axis of the work W. Thus, these side faces can be machined as radially extending faces passing through the center axis of the coupler body. This manufacturing method can be carried out by using conventional equipment or by making slight modification to conventional equipment, as described above. Therefore, the cost can be reduced.

A seal mechanism used in the above-described coupler apparatus for fire hoses, etc. will now be described. As has been described above, in order to automatically wind up and store a plurality of fire hoses, which are connected and spread, without separating them, it is necessary to drain water remaining in the fire hoses. In the case of hoses, pipes, etc. used in construction sites, dredging sites, etc., it is necessary to drain inside water at the time of moving and removing.

Figure 24:
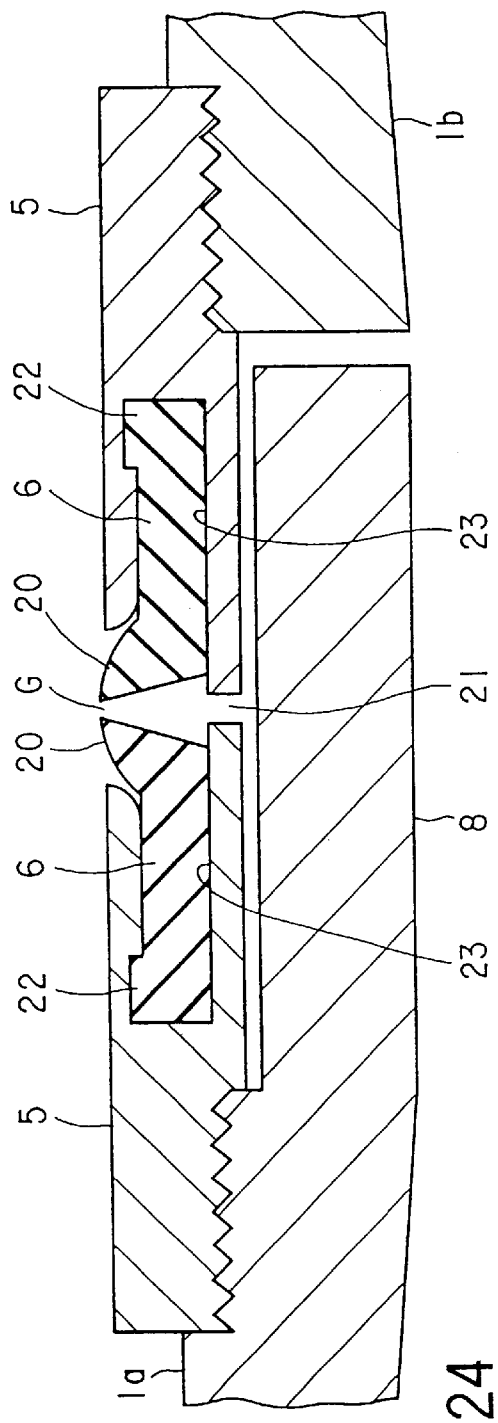
FIG. 24 is a cross-sectional view showing a first embodiment of a seal mechanism used in the coupler apparatus.
Figure 25:
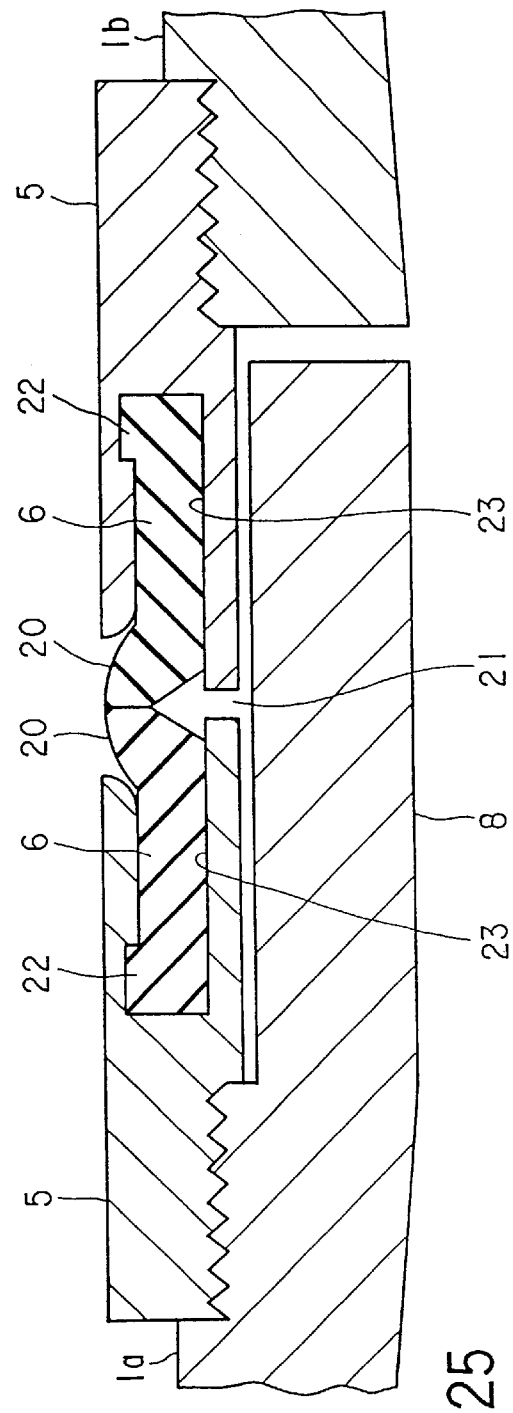
FIG. 25 is a cross-sectional view showing a close contact state of the seal mechanism shown in FIG. 24.

Seal mechanisms, which will be described below, meet the above purposes. When inside pressure of hoses, pipes, etc. decreases to a level near atmospheric pressure, inside water can be automatically discharged. FIGS. 24 and 25 show a first embodiment of the seal mechanism used in the coupler shown in FIGS. 1 to 7.

The seal-face member 5 provided on the coupler body 1a, 1b is formed of a metallic material such as an aluminum alloy. The seal-face member 5 as a whole has an annular shape and is screwed to an inner peripheral portion of a front end portion of the coupler body 1a, 1b. In the state in which the coupler bodies 1a, 1b are engaged and coupled, front end portions of the seal-face members 5 are concentrically opposed to each other. In the state in which the coupler bodies 1a, 1b are engaged and coupled, the front end faces of the seal-face members 5 are separated from each other, and an annular communication passage 21 is defined therebetween.

A seal member attachment groove 23 is formed at the front end face portion of the seal-face member 5. The seal member 6 is mounted in the seal member attachment groove 23. The seal member 6 is formed of an elastic material such as synthetic rubber and it has an annular shape as a whole. A projecting portion 22 is formed at a bottom-side edge portion of the seal member 6 in order to prevent removal from the seal member attachment groove 23.

A lip portion 20 projecting in a substantially tapered shape toward the inside of the coupler body is integrally formed at a distal-end edge portion of the seal member 6. In the state in which the coupler bodies 1a, 1b are engaged and coupled and the seal members 6 are set in the free state, the distal ends of the lip portions 20 are separated from each other, as shown in FIG. 24, and an annular communication gap G is defined therebetween. When a predetermined pressure is built in the coupler bodies 1a, 1b, the lip portions 20 are elastically deformed and bent outward and forward by the pressure. Consequently, as shown in FIG. 25, the distal ends of the lip portions 20 abut upon each other to close the communication gap G.

The shape and elastic force of the lip portions 20 and the communication gap G therebetween are properly set in accordance with the conditions of use of the coupler. For example, when the pressure within the coupler body 1a, 1b is a predetermined level or more, e.g. a minimum pressure or more for feeding water in fire hoses, the lip portions 20 are bent and put in contact, as shown in FIG. 4. When the pressure is less than the predetermined pressure, the distal ends of the lip portions 20 are separate from each other by their elastic force, and the communication gap G is defined as shown in FIG. 24.

As regards the coupler apparatus for fire hoses which has the above-described structure, where the coupler bodies 1a, 1b are coupled and plural fire hoses are connected and extended, if no internal pressure acts in the fire hoses, the communication gap G is created between the lip portions 20 of seal members 6. However, if water supply to the fire hoses is begun under a predetermined pressure, the lip portions 20 of seal members 6 are elastically deformed by this pressure and put in close contact, as shown in FIG. 25. Thus, the communication gap G is closed. Accordingly, in this case, like the prior art, the coupler bodies 1a, 1b, are sealed by the seal members 6 and water supply is conducted without leak.

If fire fighting, etc. is completed, the water supply to the fire hoses is stopped and the internal pressure decreases. In this case, the lip portions 20 of seal members 6 are restored by the elastic force and the communication gap G is created between the lip portions 20. Communication between the inside and outside of the coupler apparatus is effected via the communication gap G and communication passage 21. In the case where the fire hoses are wound up and stored without decoupling the coupler apparatus, the water remaining in the fire hoses is discharged to the outside via the communication gap G. Thus, the fire hoses can be wound up in the state in which the coupler apparatus is kept in the coupled state.

In the case of such winding up and storage, the water in the fire hoses is pressurized to some extent due to a wind-up speed or other factors. In this case, as mentioned above, the elastic force, etc. of the lip portions 20 is set to maintain the separated state under this pressure, as shown in FIG. 24.

The seal mechanism is not limited to the above embodiment. Other various structures can be applied to the seal members. The engagement mechanism of the coupler bodies is not limited to the above-described one, wherein there is no distinction between male and female. The engagement mechanism may be of the type wherein a latch member and a latch receiver are engaged, a male screw and a female screw are engaged, etc.

Figure 26:
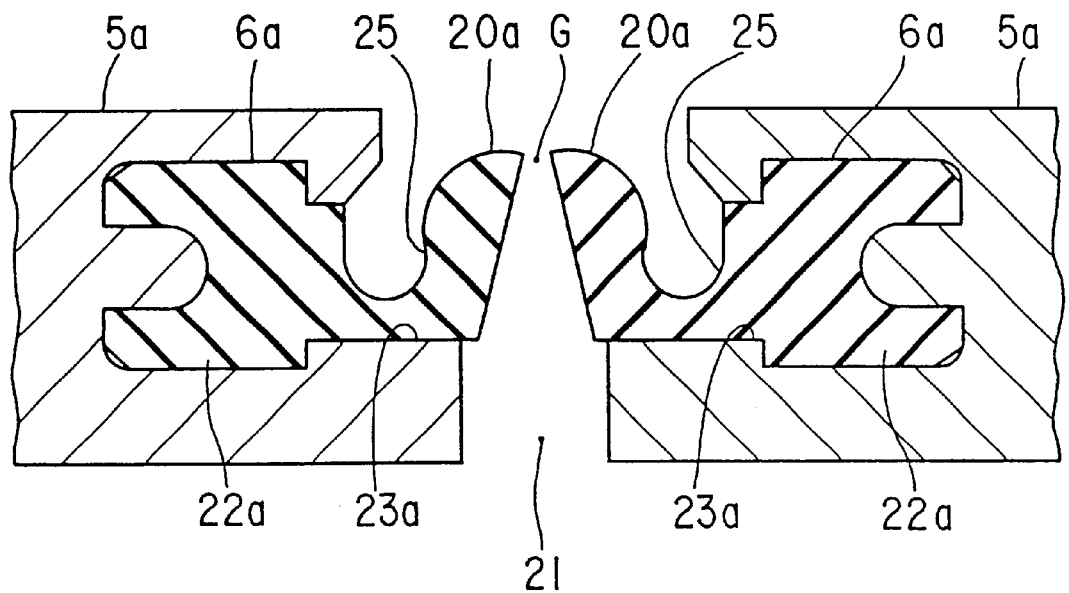
FIG. 26 is a cross-sectional view showing a second embodiment of the seal mechanism.

FIG. 26 shows a seal mechanism according to a second embodiment. This embodiment has the same structure as the seal mechanism of the first embodiment, except that the shape of the seal member differs.

In this embodiment, a seal member attachment groove 23a of a seal-face member 5a and a projecting portion 22a of a seal member 6a have forked cross sections, thereby to ensure engagement. A lip portion 20a of the seal member 6a has a large length of projection, and a pressure reception recess 25 is formed at a back side of the lip portion 20a. A predetermined communication gap G is defined between distal end portions of lip portions 20a.

In the second embodiment, the length of projection of the lip portion 20a is large, as described above, and the pressure reception recess 25 is formed at its back side. Accordingly, the amount of deformation of the lip portion 20a due to internal pressure is large, and the opening/closing of the communication gap G is controlled with high sensitivity to a variation in internal pressure.

Figure 27:
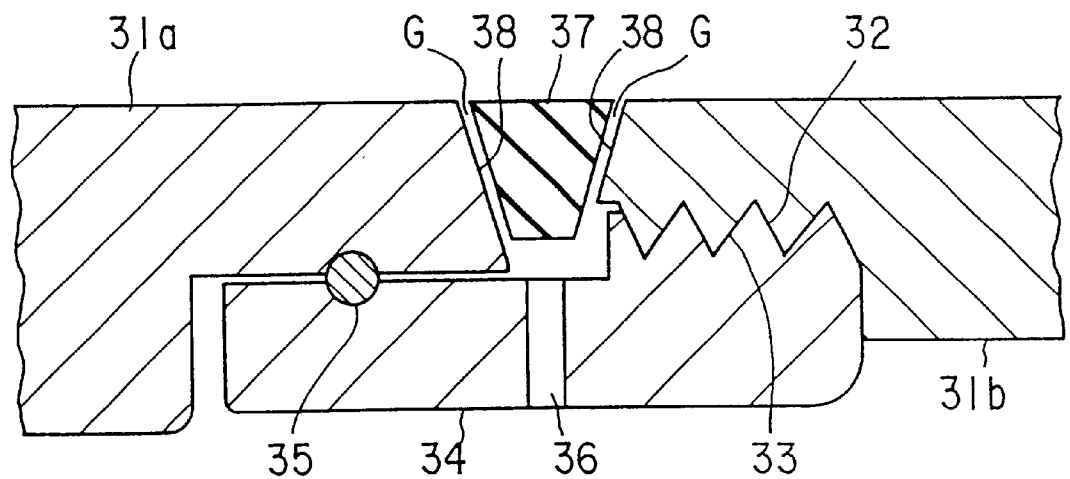
FIG. 27 is a cross-sectional view showing a third embodiment of the seal mechanism.

FIG. 27 shows a seal mechanism according to a third embodiment of the present invention. This embodiment is applied to a screw-type engagement mechanism of the coupler bodies. Specifically, in FIG. 27, numerals 31a, 31b denote coupler bodies. A screw ring 34 is rotatably attached to one coupler body 31a. Numeral 35 denotes a circlip ring for rotatably attaching the screw ring 34. A female thread 32 is formed on an inner peripheral surface of the screw ring 34, and a male thread 33 is formed on an outer peripheral surface of the other coupler body 31b. With their engagement, the coupler bodies 31a, 31b are coupled.

Seal faces 38 are formed at front end faces of the coupler bodies 31a, 31b. These seal faces 38 are tapered so that their diameters may increase inwardly. An annular seal member 37 is interposed between the seal faces 38. The seal member 37 is formed of an elastic material such as synthetic rubber, and it has a wedge-like cross-sectional shape with a width decreasing outwardly. When the seal member 37 is in the free state, its both side faces are separated from the seal faces 38 and communication gaps G are created therebetween. In addition, in this embodiment, a plurality of communication holes 36 are formed to radially penetrate a peripheral wall of the screw ring 34, and these constitute communication passages.

In the third embodiment, if a pressure within the coupler body 31a, 31b reaches a predetermined level or more, the diameter of the seal member 37 increases due to the pressure and both side faces thereof come in close contact with the seal faces 38. Thus, the communication gaps G are closed to prevent water leakage. If the internal pressure decreases below the predetermined level, the diameter of the seal member 37 is decreased by its own elastic force. Thus, the communication gaps G are created and inside water can be drained.

Figure 28:
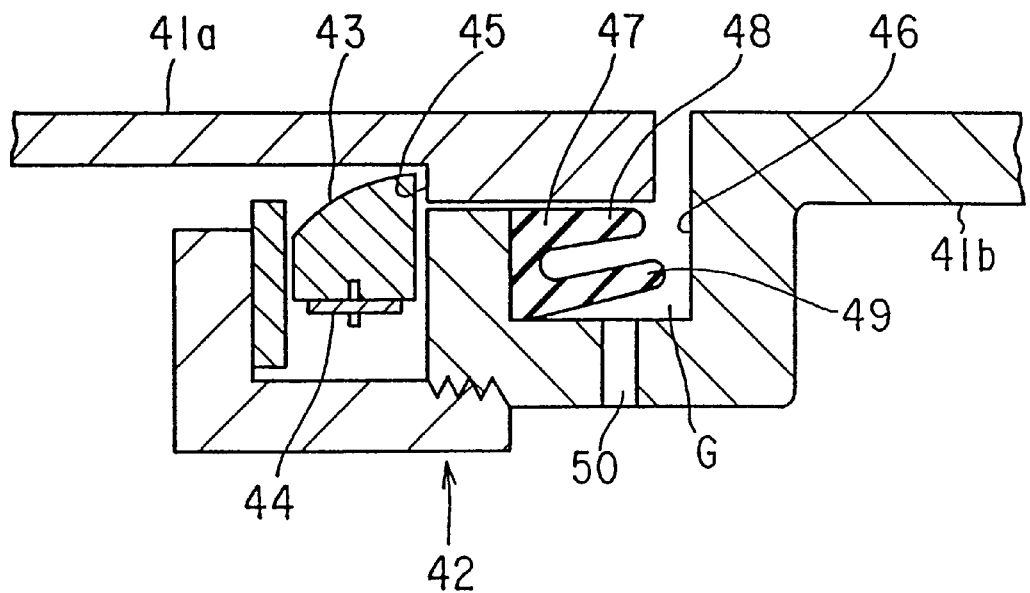
FIG. 28 is a cross-sectional view showing a fourth embodiment of the seal mechanism.

FIG. 28 shows a seal mechanism according to a fourth embodiment of the present invention. This embodiment is applied to a coupler wherein a latch engagement mechanism is used as the engagement mechanism for coupler bodies. Specifically, a latch receiving stepped portion 45 is formed at an outer peripheral portion of one coupler body 41a, and a latch mechanism 42 for engagement with the outer periphery of the coupler body 41a is formed on the other coupler body 41b. The latch mechanism 42 is provided with a latch member 43. The latch member 43 is urged by a plate spring 44. The latch member 43 is engaged with the latch receiving stepped portion 45, whereby the coupler bodies 41a, 41b are coupled. The latch member 43 is constructed to be disengaged from the latch receiving stepped portion 45 by means of an engagement release mechanism (not shown).

A seal member receiving groove 46 surrounding an outer peripheral surface of said one coupler body 41a is formed at an outer periphery of the other coupler body 41b. A seal member 47 is provided in the seal member receiving groove 46. The seal member 47 is formed of an elastic material such as synthetic rubber and it has an annular shape as a whole. The seal member 47 has a U-shaped cross section and is provided with a pair of leg portions 48, 49. Where the seal member 47 is in the free state, one leg portion 48 is put in close contact with the outer periphery of said one coupler body 41a, and the other leg portion 49 is separated from an inner peripheral seal face of the seal member receiving groove 46 of said other coupler body 41b such that a communication gap G is created therebetween. A plurality of communication holes 50 for communication with the outside are opened at the inner peripheral seal face of the seal member receiving groove 46, thereby forming communication passages.

In the fourth embodiment, when the pressure within the coupler body increases to a predetermined level or more, the leg portion 49 of seal member 47 resiliently deforms by this pressure and comes in contact with the seal face of seal member receiving groove 46, thus closing the communication gap G. When the pressure decreases to a level less than the predetermined level, the leg portion 49 restores by its own elastic force and goes out of contact with the seal face, thus creating the communication gap G. Consequently, communication between the inside and outside of the coupler body is made via the communication gap G and communication hole 50.

The second to fourth embodiments are common with the seal mechanism of the first embodiment except for the above point.

Figure 29:
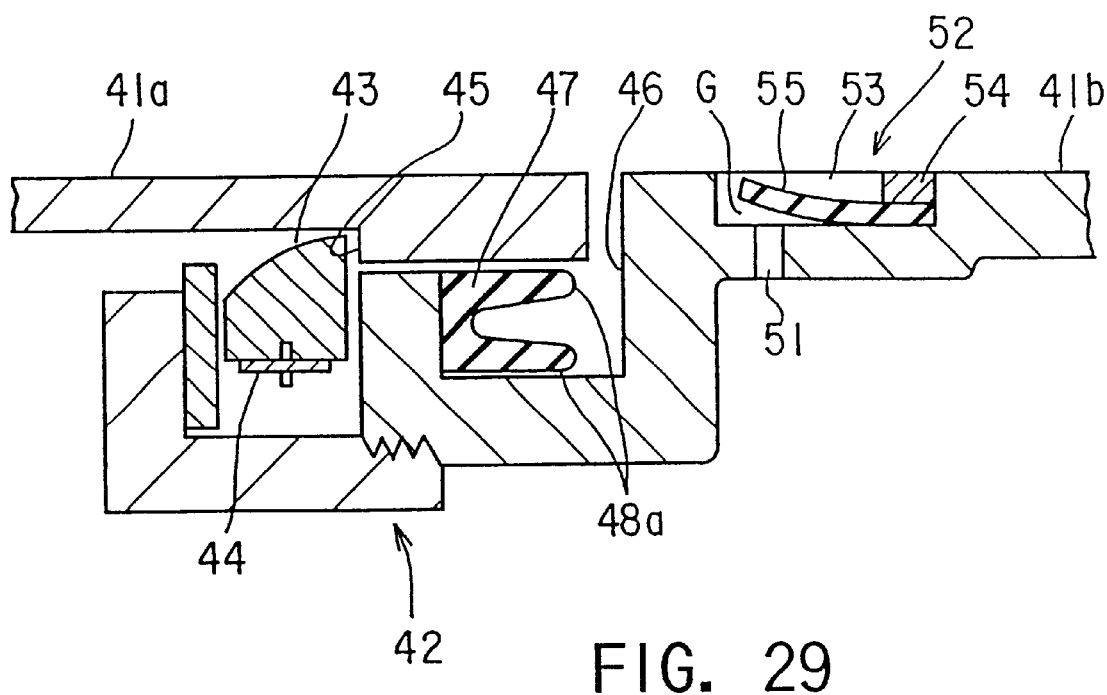
FIG. 29 is a cross-sectional view showing a fifth embodiment of the seal mechanism.

FIG. 29 shows a seal mechanism according to a fifth embodiment of the present invention. In this embodiment, a valve mechanism for communication between the inside and outside is provided in addition to the seal member. In the other respects, the fifth embodiment is common to the fourth embodiment.

Specifically, in this embodiment, the seal member 47 is provided with a pair of leg portions 48a. The leg portions 48a are put in close contact with the outer peripheral surface of said one coupler body 41a and the seal face of the seal member receiving groove 46, and serve as an ordinary seal member.

A valve mechanism 52 for releasing internal pressure is provided, for example, at a peripheral wall of one coupler body 41b, in addition to the seal member. Specifically, a U-shaped groove 53 which is continues in the circumferential direction is formed at an inner peripheral surface of said other coupler body 41b. A bottom portion of the U-shaped groove 53 is made to communicate with the outside via a plurality of pressure release holes 51. Moreover, an annular valve member 55 formed of an elastic material such as synthetic rubber is provided within the U-shaped groove 53. One end portion of the valve member 55 is fixed by a stopper ring 54. The other end portion of the valve member 55 in its free state is separated from the bottom wall of the U-shaped groove 53 and a communication gap G is created.

In this embodiment, in the state in which the coupler bodies 41a, 41b are coupled, the seal member 47 serves for sealing therebetween like an ordinary seal member. When the internal pressure is at a predetermined level or more, the valve member 55 of the valve mechanism 52 comes in close contact with the bottom wall of the U-shaped groove 53 by the pressure and closes the communication gap G. When the internal pressure decreases to a level less than the predetermined level, the valve member 55 goes out of contact with the bottom face of the U-shaped groove 53 by its own elastic force, thus creating the communication gap G. Consequently, communication between the inside and outside of the coupler body is made via the communication gap G and communication hole 51.

Except for the above point, this embodiment is common to the fourth embodiment with respect to the structure as well as operation. In this embodiment, the valve mechanism for releasing internal pressure is provided in addition to the seal member. Accordingly, the seal member and the valve mechanism can be individually designed to meet their purposes. With easier design, the pressure for opening the valve mechanism, for example, can be easily and exactly set.

The seal mechanism according to the above embodiments are applied to the coupler apparatus for fire hoses. However, the present invention is not limited to these and is generally applicable to coupler apparatuses for other hoses.

For example, the seal mechanism with the same structure is applicable to the above-mentioned coupler apparatuses for water feed hoses. In this case, prior to removal and storage of the water feed hoses, the pressure within the water feed hoses is decreased. Thereby, air is taken in from the communication gap of the coupler apparatus located at a higher level, and inside water can be completely drained from the end of the water feed hoses or from the communication gap of the coupler apparatus located at a lower level. Thus, the work for removing and storing the water feed hoses can be facilitated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coupler apparatus for coupling hoses to each other, a hose to some other device, or other members to each other, the apparatus comprising:
   a pair of coupler bodies; and
   a plurality of engaging projections disposed at a front end portion of said coupler body in a circumferential direction and projected in an axial direction, and engaging recesses formed thereamong, each projection having two side faces which are directed in a radial direction through or near a center axis of the coupler body,
   wherein said engaging projections and said engaging recesses are axially engaged with the engaging projections and engaging recesses of a mating one of said coupler bodies in a complementary manner, and
   one side face of each of said engaging projections is provided with an engaging hook portion such that said one side face is divided into at least first and second portions which are not parallel in the radial direction, and the engaging hook portions are circumferentially engaged with the engaging hook portions of the engaging projections of the mating coupling body to restrict axial movement, whereby the pair of coupler bodies are axially engaged.

2. A coupler apparatus according to claim 1, wherein said one side face of said engaging projection is provided with said engaging hook portion, the other side face of the engaging projection is inclined with respect to an axial direction of the coupler body, said engaging projection is tapered to have a width decreasing toward a distal end portion thereof, and said engaging recess is tapered to have a width decreasing toward a bottom portion thereof.

3. A coupler apparatus according to claim 1, wherein one end of each of two hoses is connected to each of said coupler bodies, the front end portions of said coupler bodies are provided with seal mechanisms, each of the seal mechanisms has an elastic seal member surrounding the end of the hose, the seal member includes a lip projecting forwardly and radially inwardly, the lips of the seal members are spaced from each other in an axial direction of each of said coupler bodies, allowing communication between a fluid within the hoses and outsides of said coupler bodies, while said coupler bodies are coupled to each other and the lips of the seal members are not subjected to a pressure more than a predetermined value from the fluid within the hoses, and the lips of the seal members are elastically moved in a radially outward direction of each of said coupler bodies, contacting each other and preventing the fluid within the hoses from communicating with the outsides of said coupler bodies, while said coupler bodies are coupled to each other and the lips of the seal members are subjected to the pressure more than the predetermined value from the fluid within the hoses.

4. A coupler apparatus according to claim 1, wherein an engaging surface of each of the engaging hook portions of each of said engaging projections extends from each of the engaging hook portions away therefrom in a direction crossing the circumferential direction of each of said engaging projections with a predetermined angle so that the distal end of the engaging surface is located backward from the proximal end of the engaging surface in the axial direction.

5. A coupler apparatus according to claim 1, wherein:
   said one side face of said engaging projection is provided with said engaging hook portion, and the other side face of the engaging projection is provided with an urging mechanism for elastically urging the other side face of the engaging projection of the mating coupler body such that said other side faces move away from each other; and
   said urging mechanism comprises:
      a cylindrical plunger body having an opening portion at an end face thereof;
      an engaging portion provided within the plunger body such that the engaging portion can project from the open portion;
      a coil spring provided within the plunger body, the coil spring being extendible/contractible in an axial direction of the plunger body and urging the engaging portion in a direction in which the projecting portion projects; and
      a viscous body provided within the plunger body, the viscous body having rigidity when quick relative movement occurs between the plunger body and the engaging portion, and the viscous body being deformed when slow relative movement occurs therebetween.

6. A coupler apparatus for coupling hoses to each other, a hose to some other device, or other members to each other, the apparatus comprising:
   a pair of coupler bodies; and
   a plurality of engaging projections disposed at a front end portion of said coupler body in a circumferential direction and projected in an axial direction, and engaging recesses formed thereamong, each projection having two side faces which are directed in a radial direction through or near a center axis of the coupler body,
      wherein said engaging projections and said engaging recesses are axially engaged with the engaging projections and engaging recesses of a mating one of said coupler bodies in a complementary manner;
   one side face of each of said engaging projections is provided with an engaging hook portion such that said one side face is divided into at least first and second portions which are not parallel in the radial direction, and the engaging hook portions are circumferentially engaged with the engaging hook portions of the engaging projections of the mating coupling body to restrict axial movement, whereby the pair of coupler bodies are axially engaged; and
   the other side face of the engaging projection is inclined with respect to an axial direction of the coupler body, said engaging projection is tapered to have a width decreasing toward a distal end portion thereof, and said engaging recess is tapered to have a width decreasing toward a bottom portion thereof.

7. A coupler apparatus for coupling hoses to each other, a hose to some other device, or other members to each other, the apparatus comprising:

a pair of coupler bodies; and a plurality of engaging projections disposed at a front end portion of said coupler body in a circumferential direction and projected in an axial direction, and engaging recesses formed thereamong, each projection having two side faces which are directed in a radial direction through or near a center axis of the coupler body, wherein said engaging projections and said engaging recesses are axially engaged with the engaging projections and engaging recesses of a mating one of said coupler bodies in a complementary manner;

one side face of each of said engaging projections is provided with an engaging hook portion such that said one side face is divided into at least first and second portions which are not parallel in the radial direction, and the engaging hook portions are circumferentially engaged with the engaging hook portions of the engaging projections of the mating coupling body to restrict axial movement, whereby the pair of coupler bodies are axially engaged; and one end of each of two hoses is connected to each of said coupler bodies, the front end portions of said coupler bodies are provided with seal mechanisms, each of the seal mechanisms has an elastic seal member surrounding the end of the hose, the seal member includes a lip projecting forwardly and radially inwardly, the lips of the seal members are spaced from each other in an axial direction of each of said coupler bodies, allowing communication between a fluid within the hoses and outsides of said coupler bodies, while said coupler bodies are coupled to each other and the lips of the seal members are not subjected to a pressure more than a predetermined value from the fluid within the hoses, and the lips of the seal members are elastically moved in a radially outward direction of each of said coupler bodies, contacting each other and preventing the fluid within the hoses from communicating with the outsides of said coupler bodies, while said coupler bodies are coupled to each other and the lips of the seal members are subjected to the pressure more than the predetermined value from the fluid within the hoses.

8. A coupler apparatus according to claim 7 wherein an engaging surface of each of the engaging hook portions of each of said engaging projections extends from each of the engaging hook portions away therefrom in a direction crossing the circumferential direction of each of said engaging projections with a predetermined angle so that the distal end of the engaging surface is located backward from the proximal end of the engaging surface in the axial direction.

* * * * *